United States Patent
Kuroda et al.

(10) Patent No.: US 6,792,538 B1
(45) Date of Patent: Sep. 14, 2004

(54) INFORMATION GENERATING METHOD AND APPARATUS, INFORMATION REPRODUCING METHOD AND APPARATUS, AND INFORMATION RECORD MEDIUM

(75) Inventors: Kazuo Kuroda, Tokorozawa (JP); Kazuyuki Yoshida, Tsurugashima (JP)

(73) Assignee: Pioneer Electronic Corporation, Tokyo-to (JP)

( * ) Notice: Subject to any disclaimer, the term of this patent is extended or adjusted under 35 U.S.C. 154(b) by 0 days.

(21) Appl. No.: 09/345,055

(22) Filed: Jun. 30, 1999

Related U.S. Application Data

(63) Continuation-in-part of application No. 09/145,913, filed on Sep. 2, 1998, now abandoned.

(30) Foreign Application Priority Data

Sep. 5, 1997 (JP) .......................................... P09-241498
Sep. 16, 1997 (JP) .......................................... P09-250986
Jun. 30, 1998 (JP) .......................................... P10-185348

(51) Int. Cl.[7] .......................... G06F 11/30; G06F 12/14; H04L 9/32
(52) U.S. Cl. ....................... 713/193; 713/181; 380/201; 380/202; 380/203
(58) Field of Search ............................... 713/193, 189, 713/181; 380/201, 203, 202

(56) References Cited

U.S. PATENT DOCUMENTS

| | | |
|---|---|---|
| 5,574,787 A | 11/1996 | Ryan |
| 5,592,454 A | 1/1997 | Tobita et al. |
| 5,930,367 A * | 7/1999 | Osawa et al. .................. 705/57 |
| 6,345,145 B1 * | 2/2002 | Sako et al. .................... 386/94 |
| 6,516,064 B1 * | 2/2003 | Osawa et al. ............... 380/201 |

FOREIGN PATENT DOCUMENTS

| | | |
|---|---|---|
| EP | 0 704 844 A1 | 4/1996 |
| EP | 0 716 544 A2 | 6/1996 |
| EP | 0 756 385 A2 | 1/1997 |

OTHER PUBLICATIONS

Patent Abstracts of Japan from European Patent Office for Publication No.: 08129828 published on May 21, 1996 and 09128890 published on May 16, 1997.

European Search Report dated Jul. 20, 1999.

* cited by examiner

*Primary Examiner*—Gilberto Barrón
*Assistant Examiner*—Joseph M McArdle
(74) *Attorney, Agent, or Firm*—Pitney Hardin LLP

(57) ABSTRACT

An information generating apparatus for generating output information to be outputted is provided with: an error correcting code adding device for adding an error correction code, which is used for an error correction of the output information when the output information is outputted, to the output information to thereby generate the output information having the error correction code; and a replacing device for replacing a part of the output information having the error correction code, which is generated by the error correcting code adding device, with identification information indicating that the output information to be outputted is not illegally copied to thereby generate the partially replaced output information.

23 Claims, 13 Drawing Sheets

INFORMATION GENERATING METHOD AND APPARATUS, INFORMATION REPRODUCING METHOD AND APPARATUS, AND INFORMATION RECORD MEDIUM

CROSS-REFERENCE TO RELATED APPLICATION

This application is a Continuation-In-Part application of U.S. Ser. No. 09/145,913 filed on Sep. 2, 1998, now abandoned.

BACKGROUND OF THE INVENTION

1. Field of the Invention

The present invention relates to an information generating apparatus, an information reproducing apparatus and an information record medium, which can protect that legally generated information is illegally copied and further illegally reproduced to be generally distributed.

2. Description of the Related Art

Video information such as a movie or the like and audio information such as a music or the like are protected by the copyrights in many cases. In these cases, it is basically prohibited to copy such information without a permission.

Moreover, an owner of the copyright needs to have a plan of effectively protecting the copy.

A method for applying to the video information or the like a modulation referred to as a "scramble" is typically employed as a method for protecting the illegal copy. This scramble modulation is a modulating method, the modulated information by which cannot be demodulated without special key data. Usually, the key data is recorded on a data record area in an optical disc or the like as record information (data to be recorded) together with the scramble-modulated video information, and then the optical disc or the like is sold.

By a user who buys the optical disc, only if the key data recorded in a reproducing device for the optical disc owned by the user coincides with the key data recorded together with the video information on the optical disc, the scramble-modulated video information can be demodulated in accordance with the key data to thereby reproduce the video information. At this time, as long as the user manages the key data to be unknown to other persons, even if only the scramble-modulated video information is illegally copied, this cannot be demodulated or reproduced.

However, in the above explained method for protecting the illegal copy, the key data is recorded on the data record area of the optical disc as the record information together with the scramble-modulated video information and the like. Thus, there may be a case in which the key data is illegally copied together with the video information and the like. This results in a problem that a person, who makes an illegal copy, may use the obtained key data to demodulate the scramble-modulated video information and the like so that he or she can view and hear it.

Moreover, in the above explained method for protecting the illegal copy, there is no technique to judge whether or not the video information or the like is legally distributed (i.e., whether or not the video information or the like is a so-called "original"). Hence, this results in a problem that even in a case of the illegally copied video information or the like, it is impossible to judge whether or not it is illegally copied.

SUMMARY OF THE INVENTION

The present invention is proposed in view of the above mentioned problems. It is therefore an object of the present invention to provide an information generating method and an information generating apparatus, an information reproducing method and an information reproducing apparatus, and an information record medium, which can protect legally generated video information, audio information or the like from being illegally copied and further illegally reproduced.

The above object of the present invention can be achieved by an information generating method of generating output information to be outputted. The information generating method is provided with: adding an error correction code, which is used for an error correction of the output information when the output information is outputted, to the output information to thereby generate the output information having the error correction code; and replacing a part of the output information having the error correction code, which is generated by the adding process, with identification information indicating that the output information to be outputted is not illegally copied to thereby generate the partially replaced output information.

According to the information generating method of the present invention, in the adding process, the error correction code is added to the output information, so that the output information having the error correction code is generated. Then, in the replacing process, the part of the output information having the error correction code is replaced with the identification information, so that the partially replaced output information is generated.

Thus, for example, when the generated partially replaced output information is recorded onto the information record medium such as a DVD or the like and then the output information is reproduced from the information record medium, by allowing the reproducing operation only when the identification information is detected, it is possible to protect the output information having no identification information (i.e., the illegally copied output information) from being illegally reproduced.

Moreover, since the part of the output information having the error correction code is replaced with the identification information after the error correction code is added, even if the identification information is detected and the output information is reproduced when the output information is reproduced for example, the identification information is erased by the error correction at the time of the reproduction. Hence, the identification information is not recorded any longer when the reproduced output information is recorded by the information recording apparatus. Therefore, the information reproducing apparatus which can reproduce the output information only when the identification information is detected can protect the reproduction of the output information recorded by the information recording apparatus. Namely, it is possible to protect the output information from being illegally reproduced.

Furthermore, for example, assuming that the partially replaced output information is transmitted to another information reproducing apparatus and is reproduced thereby, if the reproducing operation is allowed only when the identification information is detected, even if the output information having no identification information is transmitted, its illegal reproduction can be protected.

Moreover, even if the identification information is detected and the output information is reproduced after the transmission, the identification information is erased by the error correction at the time of the reproduction. Hence, the identification information is not recorded any longer when the reproduced output information is recorded by the information recording apparatus. Therefore, the information reproducing apparatus, which can reproduce the output information only when the identification information is detected, can protect the reproduction of the output information recorded by the information recording apparatus. Namely, it is possible to protect the output information from being illegally reproduced.

In one aspect of the information generating method of the present invention, the information generating method is further provided with the process of adding sub-identification information, which indicates that the output information is not illegally copied, to the output information. In the error correction code adding process, the error correction code is added to the output information to which the sub-identification information is added to thereby generate the output information having the error correction code and the sub-identification information. Assuming that M represents the sub-identification information and N represents the identification information, a relationship between the sub-identification information M and the identification information N is expressed on the basis of a predetermined function f by a following expression (1).

$$M=f(N) \tag{1}$$

According to this aspect, in the sub-identification adding process, the sub-identification information is added to the output information. Then, in the error correction code adding:process, the error correction code is added to the output information to which the sub-identification information is added, so that the output information having the error correction code and the sub-identification information is generated. At this time, the sub-identification information M is a predetermined function of the identification information N.

Thus, for example, when the output information is reproduced from the information record medium, by allowing the reproducing operation only when both of the sub-identification information M and the identification information N are detected, even if either one of the sub-identification information M and the identification information N is obtained by some unjust or unfair method, another one of the sub-identification information M and the identification information N cannot be correctly obtained unless the function f is determined. Therefore, in the reproducing apparatus for reproducing the output information, it is possible to more effectively protect the output information, which has been illegally recorded, from being reproduced.

In another aspect of the information generating method of the present invention, the error correction code comprises an inner code inspection symbol and an outer code inspection symbol. In the replacing process, the part of the output information having the error correction code at a portion thereof where the inner code inspection symbol and the outer code inspection symbol overlap to each other is replaced with the identification information.

According to this aspect, for example, the inner code inspection symbol or the outer code inspection symbol used for the error correction of the output information itself at the time of reproducing the output information which has been recorded on the information record medium, is not replaced with the identification information. Thus, the error correction ability with respect to the output information itself is not degraded. Further, in the similar manner, at the time of reproducing the output information which has been transmitted, the error correction ability with respect to the output information itself is not degraded.

The above object of the present invention can be also achieved by a first information record medium on and from which record information is recorded and reproduced. The first information record medium is provided with: an error correction code recorded on the information record medium by adding the error correction code, which is used for an error correction of the record information when the record information is reproduced, to the record information to thereby generate the record information having the error correction code; and identification information recorded on the information record medium by replacing a part of the record information having the error correction code, with the identification information indicating that the record information to be reproduced is not illegally copied to thereby generate the partially replaced record information.

According to the first information record medium of the present invention, by replacing the part of the record information having the error correction code with the identification information, the partially replaced record information is recorded. Thus, by allowing the reproduction only when the identification is detected at the time of reproducing the partially replaced record information form the information record medium, it is possible to protect the record information, which does not have the identification information (i.e., which has been illegally copied), from being illegally reproduced.

Further, since the part of the record information having the error correction code is replaced with the identification information, even if the identification information is detected and the record information is reproduced, the identification information is erased by the error correction at the time of reproduction. Thus, at the time of recording the reproduced record information by another information recording apparatus, the identification information is not recorded. Thus, by allowing the reproduction of the record information only when the identification information is detected, it is possible to protect the record information recorded by this another information recording apparatus.

In one aspect of the first information record medium of the present invention, the information record medium is further provided with sub-identification information recorded on the information record medium by adding the sub-identification information, which indicates that the record information is not illegally copied, to the record information in advance. The error correction code is recorded by adding the error correction code to the record information to which the sub-identification information is added to thereby generate the record information having the error correction code and the sub-identification information. Assuming that M represents the sub-identification information and N represents the identification information, a relationship between the sub-identification information M and the identification information N is expressed on the basis of a predetermined function f by the aforementioned expression (1) (i.e., M=f(N)).

According to this aspect, the output information having the error correction code and the sub-identification information is recorded on the information record medium, and that the sub-identification information M is a predetermined function of the identification information N.

Thus, for example, when the record information is reproduced from the information record medium, by allowing the reproducing operation only when both of the sub-identification information M and the identification information N are detected, even if either one of the sub-identification information M and the identification information N is obtained by some unjust or unfair method, another one of the sub-identification information M and the identification information N cannot be correctly obtained unless the function f is determined. Therefore, in the reproducing apparatus for reproducing the record information, it is possible to more effectively protect the record information, which has been illegally recorded, from being reproduced.

In another aspect of the first information record medium, the error correction code comprises an inner code inspection symbol and an outer code inspection symbol. The part of the record information having the error correction code at a portion thereof where the inner code inspection symbol and the outer code inspection symbol overlap to each other is replaced with the identification information.

According to this aspect, for example, the inner code inspection symbol or the outer code inspection symbol used for the error correction of the record information itself at the time of reproducing the record information which has been recorded on the information record medium, is not replaced with the identification information. Thus, the error correction ability with respect to the record information itself is not degraded.

The above object of the present invention can be also achieved by a first information reproducing method of reproducing record information from the above described information record medium such as a DVD or the like of the present invention. The first information reproducing method is provided with the processes of: detecting the partially replaced record information from the information record medium; extracting the identification information from the partially replaced record information detected by the detecting process; judging whether or not the identification information is extracted by the extracting process; and reproducing the record information by applying the error correction to the partially replaced record information, which is detected by the detecting process, by use of the error correction code only if the identification information is judged to be extracted by the judging process.

According to the first information reproducing method, at first in the detecting process, the partially replaced record information is detected from the information record medium. Then, in the extracting process, the identification information is extracted from the partially replaced record information. Then, in the judging process, it is judged whether or not the identification information is extracted. Finally, in the reproducing process, only if the identification information is judged to be extracted, the record information is reproduced by applying the error correction to the partially replaced record information by use of the error correction code.

Therefore, since the reproduction can be performed only when the identification information is detected, it is possible to protect the record information having no identification information (i.e., the illegally copied record information) from being illegally reproduced.

Further, since the part of the record information having the error correction code is replaced with the identification information, the identification information is erased by the error correction at the time of reproduction. Thus, at the time of recording the reproduced record information by another information recording apparatus, the identification information is not recorded. Therefore, by allowing the reproduction of the record information only when the identification information is detected, it is possible to protect the record information recorded by this another information recording apparatus.

The above object of the present invention can be also achieved by a second information reproducing method of reproducing record information from the above described information record medium such as a DVD or the like of the present invention. The second information reproducing method is provided with the processes of: detecting the partially replaced record information from the information record medium; extracting the identification information from the partially replaced record information detected by the detecting process; judging whether or not the identification information is extracted by the extracting process; applying the error correction to the partially replaced record information, which is detected by the detecting process, by use of the error correction code; and reproducing the record information on the basis of the partially replaced record information, to which the error correction is applied, only if the identification information is judged to be extracted by the judging process.

According to the second information reproducing method, at first in the detecting process, the partially replaced record information is detected from the information record medium. Then, in the extracting process, the identification information is extracted from the partially replaced record information. Then, in the judging process, it is judged whether or not the identification information is extracted. Then, in the error correction applying process, the error correction is applied to the partially replaced record information by use of the error correction code. Finally, in the reproducing process, only if the identification information is judged to be extracted, the record information is reproduced on the basis of the partially replaced record information.

Therefore, since the reproduction can be performed only when the identification information is detected, it is possible to protect the record information having no identification information (i.e., the illegally copied record information) from being illegally reproduced.

Further, since the part of the record information having the error correction code is replaced with the identification information, the identification information is erased by the error correction at the time of reproduction. Thus, at the time of recording the reproduced record information by another information recording apparatus, the identification information is not recorded. Therefore, by allowing the reproduction of the record information only when the identification information is detected, it is possible to protect the record information recorded by this another information recording apparatus.

In one aspect of each of the first and second information reproducing methods of the present invention, the information record medium is further provided with sub-identification information recorded on the information record medium by adding the sub-identification information, which indicates that the record information is not illegally copied, to the record information in advance. The error correction code is recorded by adding the error correction code to the record information to which the sub-identification information is added to thereby generate the record information having the error correction code and the sub-identification information. Assuming that M represents the sub-identification information and N represents the identification information, a relationship between the sub-identification information M and the identification information N is expressed on the basis of a predetermined function f by the aforementioned expression (1) (i.e., M=f(N)). In the extracting process, the identification information and the sub-identification information are extracted from the partially replaced record information. In the judging process, it is judged whether or not the identification information is extracted, and it is judged whether or not the relationship is expressed by the expression (1). In the reproducing process, the record information is reproduced only if the identification information is judged to be extracted and the relationship is judged to be expressed by the expression (1).

According to this aspect, in the extracting process, the identification information and the sub-identification information are extracted from the partially replaced record information. Then, in the judging process, it is judged whether or not the identification information is extracted, and it is judged whether or not the relationship is expressed by the expression (1). Finally, in the reproducing process, only if the identification information is judged to be extracted and the relationship is judged to be expressed by the expression (1), the record information is reproduced.

Thus, since the reproducing operation is performed only when both of the sub-identification information M and the identification information N are detected, even if either one of the sub-identification information M and the identification information N is obtained by some unjust or unfair method, another one of the sub-identification information M and the identification information N cannot be correctly obtained unless the function f is determined. Therefore, at the time of reproduction, it is possible to more effectively protect the record information, which has been illegally recorded, from being reproduced.

In another aspect of each of the first and second information reproducing methods of the present invention, the error correction code comprises an inner code inspection symbol and an outer code inspection symbol. The part of the record information having the error correction code at a portion thereof where the inner code inspection symbol and the outer code inspection symbol overlap to each other is replaced with the identification information.

According to this aspect, the inner code inspection symbol or the outer code inspection symbol used for the error correction of the record information itself is not replaced with the identification information. Thus, the error correction ability with respect to the record information itself is not degraded.

The above object of the present invention can be also achieved by a first information generating apparatus for generating output information to be outputted. The first information generating apparatus is provided with: an error correcting code adding device for adding an error correction code, which is used for an error correction of the output information when the output information is outputted, to the output information to thereby generate the output information having the error correction code; and a replacing device for replacing a part of the output information having the error correction code, which is generated by the error correcting code adding device, with identification information indicating that the output information to be outputted is not illegally copied to thereby generate the partially replaced output information.

According to the first information generating apparatus of the present invention, by the error correcting code adding device, the error correction code is added to the output information, so that the output information having the error correction code is generated. Then, by the replacing device, the part of the output information having the error correction code is replaced with the identification information, so that the partially replaced output information is generated.

Thus, for example, when the generated partially replaced output information is recorded onto the information record medium such as a DVD or the like and then the output information is reproduced from the information record medium, by allowing the reproducing operation only when the identification information is detected, it is possible to protect the output information having no identification information (i.e., the illegally copied output information) from being illegally reproduced.

Moreover, since the part of the output information having the error correction code is replaced with the identification information after the error correction code is added, even if the identification information is detected and the output information is reproduced when the output information is reproduced for example, the identification information is erased by the error correction at the time of the reproduction. Hence, the identification information is not recorded any longer when the reproduced output information is recorded by the information recording apparatus. Therefore, the information reproducing apparatus which can reproduce the output information only when the identification information is detected can protect the reproduction of the output information recorded by the information recording apparatus.

Furthermore, for example, assuming that the partially replaced output information is transmitted to another information reproducing apparatus and is reproduced thereby, if the reproducing operation is allowed only when the identification information is detected, even if the output information having no identification information is transmitted, its illegal reproduction can be protected.

Moreover, even if the identification information is detected and the output information is reproduced after the transmission, the identification information is erased by the error correction at the time of the reproduction. Hence, the identification information is not recorded any longer when the reproduced output information is recorded by the information recording apparatus. Therefore, the information reproducing apparatus, which can reproduce the output information only when the identification information is detected, can protect the reproduction of the output information recorded by the information recording apparatus.

In one aspect of the first information generating apparatus of the present invention, the information generating apparatus is further provided with a sub-identification information adding device for adding sub-identification information, which indicates that the output information is not illegally copied, to the output information. The error correction code adding device adds the error correction code to the output information to which the sub-identification information is added to thereby generate the output-information having the error correction code and the sub-identification information. Assuming that M represents the sub-identification information and N represents the identification information, a relationship between the sub-identification information M and the identification information N is expressed on the basis of a predetermined function f by the expression (1) (i.e., $M=f(N)$).

According to this aspect, for example, when the output information is reproduced from the information record medium, by allowing the reproducing operation only when both of the sub-identification information M and the identification information N are detected, even if either one of the sub-identification information M and the identification information N is obtained by some unjust or unfair method, another one of the sub-identification information M and the identification information N cannot be correctly obtained unless the function f is determined. Therefore, in the reproducing apparatus for reproducing the output information, it is possible to more effectively protect the output information, which has been illegally recorded, from being reproduced.

In another aspect of the first information generating apparatus of the present invention, the error correction code comprises an inner code inspection symbol and an outer code inspection symbol. The replacing device replaces the part of the output information having the error correction code at a portion thereof where the inner code inspection symbol and the outer code inspection symbol overlap to each other with the identification information.

According to this aspect, for example, the inner code inspection symbol or the outer code inspection symbol used for the error correction of the output information itself at the time of reproducing the output information which has been recorded on the information record medium, is not replaced with the identification information. Thus, the error correction ability with respect to the output information itself is not degraded. Further, in the similar manner, at the time of reproducing the output information which has been transmitted, the error correction ability with respect to the output information itself is not degraded.

The above object of the present invention can be also achieved by a first information reproducing apparatus for reproducing record information from the above described information record medium of the present invention. The first information reproducing apparatus is provided with: a detecting device for detecting the partially replaced record information from the information record medium; an extracting device for extracting the identification information from the partially replaced record information detected by the detecting device; a judging device for judging whether or not the identification information is extracted by the extracting device; and a reproducing device for reproducing the record information by applying the error correction to the partially replaced record information, which is detected by the detecting device, by use of the error correction code only if the identification information is judged to be extracted by the judging device.

According to the first information reproducing apparatus, at first by the detecting device, the partially replaced record information is detected from the information record medium. Then, by the extracting device, the identification information is extracted from the partially replaced record information. Then, by the judging device, it is judged whether or not the identification information is extracted. Finally, by the reproducing device, only if the identification information is judged to be extracted, the record information is reproduced by applying the error correction to the partially replaced record information by use of the error correction code.

Therefore, since the reproduction can be performed only when the identification information is detected, it is possible to protect the record information having no identification information (i.e., the illegally copied record information) from being illegally reproduced.

Further, since the part of the record information having the error correction code is replaced with the identification information, the identification information is erased by the error correction at the time of reproduction. Thus, at the time of recording the reproduced record information by another information recording apparatus, the identification information is not recorded. Therefore, by allowing the reproduction of the record information only when the identification information is detected, it is possible to protect the record information recorded by this another information recording apparatus.

The above object of the present invention can be also achieved by a second information reproducing apparatus for reproducing record information from the above described information record medium of the present invention. The second information reproducing apparatus is provided with: a detecting device for detecting the partially replaced record information from the information record medium; an extracting device for extracting the identification information from the partially replaced record information detected by the detecting device; a judging device for judging whether or not the identification information is extracted by the extracting device; an error correction applying device for applying the error correction to the partially replaced record information, which is detected by the detecting device, by use of the error correction code; and a reproducing device for reproducing the record information on the basis of the partially replaced record information, to which the error correction is applied, only if the identification information is judged to be extracted by the judging device.

Therefore, since the reproduction can be performed only when the identification information is detected, it is possible to protect the record information having no identification information (i.e., the illegally copied record information) from being illegally reproduced.

Further, since the part of the record information having the error correction code is replaced with the identification information, the identification information is erased by the error correction at the time of reproduction. Thus, at the time of recording the reproduced record information by another information recording apparatus, the identification information is not recorded. Therefore, by allowing the reproduction of the record information only when the identification information is detected, it is possible to protect the record information recorded by this another information recording apparatus.

In one aspect of each of the first and second information reproducing apparatuses of the present invention, the information record medium is further provided with sub-identification information recorded on the information record medium by adding the sub-identification information, which indicates that the record information is not illegally copied, to the record information in advance. The error correction code is recorded by adding the error correction code to the record information to which the sub-identification information is added to thereby generate the record information having the error correction code and the sub-identification information. Assuming that M represents the sub-identification information and N represents the identification information, a relationship between the sub-identification information M and the identification information N is expressed on the basis of a predetermined function f by the expression (1) (i.e., $M=f(N)$). The extracting device extracts the identification information and the sub-identification information from the partially replaced record information. The judging device judges whether or not the identification information is extracted, and whether or not the relationship is expressed by the expression (1). The reproducing device reproduces the record information only if the identification information is judged to be extracted and the relationship is judged to be expressed by the expression (1).

According to this aspect, by the extracting process, the identification information and the sub-identification information are extracted from the partially replaced record information. Then, by the judging process, it is judged whether or not the identification information is extracted, and it is judged whether or not the relationship is expressed by the expression (1). Finally, by the reproducing process, only if the identification information is judged to be extracted and the relationship is judged to be expressed by the expression (1), the record information is reproduced.

Thus, since the reproducing operation is performed only when both of the sub-identification information M and the identification information N are detected, even if either one of the sub-identification information M and the identification information N is obtained by some unjust or unfair method, another one of the sub-identification information M and the identification information N cannot be correctly obtained unless the function f is determined. Therefore, at the time of reproduction, it is possible to more effectively protect the record information, which has been illegally recorded, from being reproduced.

In another aspect of each of the first and second information reproducing apparatuses of the present invention, the error correction code comprises an inner code inspection symbol and an outer code inspection symbol. The part of the record information having the error correction code at a portion thereof where the inner code inspection symbol and the outer code inspection symbol overlap to each other is replaced with the identification information.

According to this aspect, the inner code inspection symbol or the outer code inspection symbol used for the error correction of the record information itself is not replaced with the identification information. Thus, the error correction ability with respect to the record information itself is not degraded.

The above object of the present invention can be achieved by a second information record medium on and from which record information is recorded and reproduced provided with: an error correction code recorded on the information record medium by adding the error correction code, which is used for an error correction of the record information when the record information is reproduced, to the record information to thereby generate the record information having the error correction code; identification information recorded on the information record medium by replacing one part of the record information having the error correction code with the identification information indicating that the record information to be reproduced is not illegally copied to thereby generate the partially replaced record information; and position information recorded on the information record medium by replacing another part of the record information having the error correction code with the position information indicating a position of the identification information within the partially replaced record information.

According to the second information record medium of the present invention, by replacing the part of the record information having the error correction code with the identification information, the partially replaced record information is recorded. Thus, by allowing the reproduction only when the identification is detected at the time of reproducing the partially replaced record information form the information record medium, it is possible to protect the record information, which does not have the identification information (i.e., which has been illegally copied), from being illegally reproduced.

Further, since the part of the record information having the error correction code is replaced with the identification information, even if the identification information is detected and the record information is reproduced, the identification information is erased by the error correction at the time of reproduction. Thus, at the time of recording the reproduced record information by another information recording apparatus, the identification information is not recorded.

Thus, by allowing the reproduction of the record information only when the identification information is detected, it is possible to protect the record information recorded by this another information recording apparatus.

Furthermore, since another part of the record information having the error correction code is replaced with the position information indicating the position of the identification information, even if the replacement position of the identification information within the partially replaced record information is changed in order to prevent the illegal copy, it is possible to extract the identification information by using the position information as the clue. Thus, by changing the replacement position of the identification information, it is possible to prevent the identification information from being illegally read out before the error correction at the time of reproducing the record information.

In one aspect of the second information record medium of the present invention, the identification information is generated by rearranging each of codes constituting original identification information, which is set in advance and which indicates that the record information is not illegally copied.

According to this aspect, since the identification information is generated by rearranging the codes constituting the original identification information indicating the non-illegal copy, even if the identification information is read out before the error correction at the time of reproducing the record information, it is possible to prevent the original identification information from being recognized.

In this aspect, the identification information may be generated by rearranging the codes, which correspond to a plurality of error correction units for the error correction, simultaneously within the original identification information.

By constructing in this manner, since the rearrangement over the plurality of error correction units is performed, it is possible to prevent the leakage of the identification information more effectively at the time of reproducing the record information.

In another aspect of the second information record medium of the present invention, the partially replaced record information is generated by replacing one portion of the record information having the error correction code such that one identification information is included over a plurality of error correction units for the error correction.

According to this aspect, since one identification information is included over the plurality of error correction units, it is possible to prevent the leakage of the identification information even more effectively at the time of recording the record information.

In another aspect of the second information record medium of the present invention, the record information before adding the error correction code is enciphered by an enciphering process which is varied in correspondence with a time of enciphering, and a content of the enciphering process and version information indicating the time of enciphering are included in the identification information.

According to this aspect, since the content of the enciphering process and the time of enciphering are included in the version information, by selecting the content of the deciphering process for deciphering the enciphered information in accordance with the time of enciphering for each content of the enciphering process at the time of reproducing the record information, even if the content of one enciphering process is leaked at the time of reproduction, it is possible to decipher the enciphered data by use of another enciphering process so as to effectively prevent the illegal copy.

In this aspect, encipher key information indicating an encipher key used in the enciphering process may be included in the identification information.

By constructing in this manner, since the enciphered output information cannot be deciphered if the identification information cannot be obtained at the time of reproduction, it is possible to effectively prevent the illegal copy.

Further in this case, the encipher key information may be inserted in the identification information after the encipher key information is enciphered by an enciphering process which is set in advance.

By constructing in this manner, since the encipher key information for the enciphering process is further enciphered, it is very difficult to decipher the enciphered record information.

In another aspect of the second information record medium of the present invention, the partially replaced record information is generated by replacing one part of the record information having the error correction code with (i) the error correction code, which is used for an error correction of the identification information when the record information is reproduced, and (ii) the identification information.

According to this aspect, even if the identification information becomes erroneous at the time of reproduction, it is possible to correct this and thereby certainly recognize the identification information.

In another aspect of the second information record medium of the present invention, the information record medium further comprises sub-identification information recorded on the information record medium by adding the sub-identification information, which indicates that the record information is not illegally copied, to the record information in advance, the error correction code is recorded by adding the error correction code to the record information to which the sub-identification information is added to thereby generate the record information having the error correction code and the sub-identification information, and assuming that M represents the sub-identification information and N represents the identification information, a relationship between the sub-identification information M and the identification information N is expressed on the basis of a predetermined function f by a following expression (1).

$$M=f(N) \quad (1)$$

According to this aspect, the output information having the error correction code and the sub-identification information is recorded on the information record medium, and that the sub-identification information M is a predetermined function of the identification information N.

Thus, for example, when the record information is reproduced from the information record medium, by allowing the reproducing operation only when both of the sub-identification information M and the identification information N are detected, even if either one of the sub-identification information M and the identification information N is obtained by some unjust or unfair method, another one of the sub-identification information M and the identification information N cannot be correctly obtained unless the function f is determined. Therefore, in the reproducing apparatus for reproducing the record information, it is possible to more effectively protect the record information, which has been illegally recorded, from being reproduced.

In another aspect of the second information record medium of the present invention, the error correction code comprises an inner code inspection symbol and an outer code inspection symbol, and one part of the record information having the error correction code at a portion thereof where the inner code inspection symbol and the outer code inspection symbol overlap to each other is replaced with the identification information.

According to this aspect, for example, the inner code inspection symbol or the outer code inspection symbol used for the error correction of the record information itself at the time of reproducing the record information which has been recorded on the information record medium, is not replaced with the identification information. Thus, the error correction ability with respect to the record information itself is not degraded.

The above object of the present invention can be also achieved by a second information generating apparatus for generating output information to be outputted, provided with: an error correcting code adding device for adding an error correction code, which is used for an error correction of the output information when the output information is outputted, to the output information to thereby generate the output information having the error correction code; and a replacing device for replacing one part of the output information having the error correction code, which is generated by the error correcting code adding device, with identification information indicating that the output information to be outputted is not illegally copied to thereby generate the partially replaced output information, and for replacing another part of the output information having the error correction code with position information indicating a position of the identification information within the partially replaced output information.

According to the second information generating apparatus of the present invention, by the error correcting code adding device, the error correction code is added to the output information, so that the output information having the error correction code is generated. Then, by the replacing device, one part of the output information having the error correction code is replaced with the identification information, so that the partially replaced output information is generated.

Thus, for example, when the generated partially replaced output information is recorded onto the information record medium such as a DVD or the like and then the output information is reproduced from the information record medium, by allowing the reproducing operation only when the identification information is detected, it is possible to protect the output information having no identification information (i.e., the illegally copied output information) from being illegally reproduced.

Moreover, since the part of the output information having the error correction code is replaced with the identification information after the error correction code is added, even if the identification information is detected and the output information is reproduced when the output information is reproduced for example, the identification information is erased by the error correction at the time of the reproduction. Hence, the identification information is not recorded any longer when the reproduced output information is recorded by the information recording apparatus.

Therefore, the information reproducing apparatus which can reproduce the output information only when the identification information is detected can protect the reproduction of the output information recorded by the information recording apparatus.

Furthermore, for example, assuming that the partially replaced output information is transmitted to another information reproducing apparatus and is reproduced thereby, if the reproducing operation is allowed only when the identification information is detected, even if the output information having no identification information is transmitted, its illegal reproduction can be protected.

Moreover, even if the identification information is detected and the output information is reproduced after the transmission, the identification information is erased by the error correction at the time of the reproduction. Hence, the identification information is not recorded any longer when the reproduced output information is recorded by the information recording apparatus. Therefore, the information reproducing apparatus, which can reproduce the output information only when the identification information is detected, can protect the reproduction of the output information recorded by the information recording apparatus.

Furthermore, since another part of the record information having the error correction code is replaced with the position information indicating the position of the identification information, even if the replacement position of the identification information within the partially replaced output information is changed in order to prevent the illegal copy, it is possible to extract the identification information by using the position information as the clue. Thus, by changing the replacement position of the identification information, it is possible to prevent the identification information from being illegally read out before the error correction at the time of outputting the output information.

In one aspect of the second information generating apparatus of the present invention, the apparatus is further provided with a rearranging device for rearranging each of codes constituting original identification information, which is set in advance and which indicates that the output information is not illegally copied, to thereby generate the identification information, and the replacing device replaces one part of the output information having the error correction code with the identification information generated by the rearranging device, to thereby generate the partially replaced output information.

According to this aspect, since the identification information is generated by rearranging the codes constituting the original identification information indicating the non-illegal copy, even if the identification information is read out before the error correction at the time of outputting the output information, it is possible to prevent the original identification information from being recognized.

In this aspect, the rearranging device may rearrange the codes, which correspond to a plurality of error correction units for the error correction, simultaneously within the original identification information, to thereby generate the identification information.

By constructing in this manner, since the rearrangement over the plurality of error correction units is performed, it is possible to prevent the leakage of the identification information more effectively at the time of outputting the output information.

In another aspect of the second information generating apparatus of the present invention, the replacing device replaces one portion of the output information having the error correction code such that one identification information is included over a plurality of error correction units for the error correction.

According to this aspect, since one identification information is included over the plurality of error correction units, it is possible to prevent the leakage of the identification information even more effectively at the time of outputting the output information.

In another aspect of the second information generating apparatus of the present invention, the apparatus is further provided with an enciphering device for enciphering the output information before adding the error correction code by an enciphering process which is varied in correspondence with a time of enciphering, and a content of the enciphering process and version information indicating the time of enciphering are included in the identification information.

According to this aspect, since the content of the enciphering process and the time of enciphering are included in the version information, by selecting the content of the deciphering process for deciphering the enciphered information in accordance with the time of enciphering for each content of the enciphering process at the time of outputting the output information, even if the content of one enciphering process is leaked at the time of reproduction, it is possible to decipher the enciphered data by use of another enciphering process so as to effectively prevent the illegal copy.

In this aspect, encipher key information indicating an encipher key used in the enciphering process may be included in the identification information.

By constructing in this manner, since the enciphered output information cannot be deciphered if the identification information cannot be obtained at the time of outputting, it is possible to effectively prevent the illegal copy.

Further in this case further, the apparatus may be further provided with an encipher key inserting device for inserting the encipher key information into the identification information after enciphering the encipher key information by an enciphering process which is set in advance.

By constructing in this manner, since the encipher key information for the enciphering process is further enciphered, it is very difficult to decipher the enciphered record information.

In another aspect of the second information generating apparatus of the present invention, the replacing device replaces one part of the output information having the error correction code with (i) the error correction code, which is used for an error correction of the identification information when the output information is outputted, and (ii) the identification information, to thereby generate the partially replaced output information.

According to this aspect, even if the identification information becomes erroneous at the time of outputting, it is possible to correct this and thereby certainly recognize the identification information.

In another aspect of the second information generating apparatus of the present invention, the information generating apparatus further comprises a sub-identification information adding device for adding sub-identification information, which indicates that the output information is not illegally copied, to the output information, the error correction code adding device adds the error correction code to the output information to which the sub-identification information is added to thereby generate the output information having the error correction code and the sub-identification information, and assuming that M represents the sub-identification information and N represents the identification information, a relationship between the sub-identification information M and the identification information N is expressed on the basis of a predetermined function f by a following expression (1).

$$M = f(N) \qquad (1)$$

According to this aspect, for example, when the output information is reproduced from the information record medium, by allowing the reproducing operation only when both of the sub-identification information M and the identification information N are detected, even if either one of the sub-identification information M and the identification information N is obtained by some unjust or unfair method, another one of the sub-identification information M and the identification information N cannot be correctly obtained unless the function f is determined. Therefore, in the reproducing apparatus for reproducing the output information, it is possible to more effectively protect the output information, which has been illegally recorded, from being reproduced.

In another aspect of the second information generating apparatus of the present invention, the error correction code comprises an inner code inspection symbol and an outer code inspection symbol, and the replacing device replaces one part of the output information having the error correction code at a portion thereof where the inner code inspection symbol and the outer code inspection symbol overlap to each other with the identification information.

According to this aspect, for example, the inner code inspection symbol or the outer code inspection symbol used for the error correction of the output information itself at the time of reproducing the output information which has been recorded on the information record medium, is not replaced with the identification information. Thus, the error correction ability with respect to the output information itself is not degraded. Further, in the similar manner, at the time of reproducing the output information which has been transmitted, the error correction ability with respect to the output information itself is not degraded.

The nature, utility, and further features of this invention will be more clearly apparent from the following detailed description with respect to preferred embodiments of the invention when read in conjunction with the accompanying drawings briefly described below.

DETAILED DESCRIPTION OF THE PREFERRED EMBODIMENTS

Next, preferred embodiments of the present invention will be explained with reference to the drawings. Incidentally, embodiments described below are embodiments in which the present invention is applied to an illegal copy preventing system including an information recording apparatus for recording information onto the DVD (more concretely, a cutting apparatus for cutting or manufacturing a stamper disc used for a mass production of the DVD) and an information reproducing apparatus for reproducing the information from the DVD. Here, the DVD is one type of an optical disc in which a record capacity is improved by more than about seven times that of a conventional CD (Compact Disc) which is another type of an optical disc.

(I) First Embodiment of Illegal Copy Preventing System

First of all, a first embodiment of an illegal copy preventing system according to the present invention is explained with reference to FIGS. 1 to 7.

(A) Cutting Device

At first, an embodiment of the cutting device in the first embodiment of the illegal copy preventing system (hereinafter, it is simply referred to as a first embodiment) is explained with reference to FIGS. 1 to 5.

A configuration of the cutting device in the embodiment is explained with reference to FIG. 1.

Figure 1:
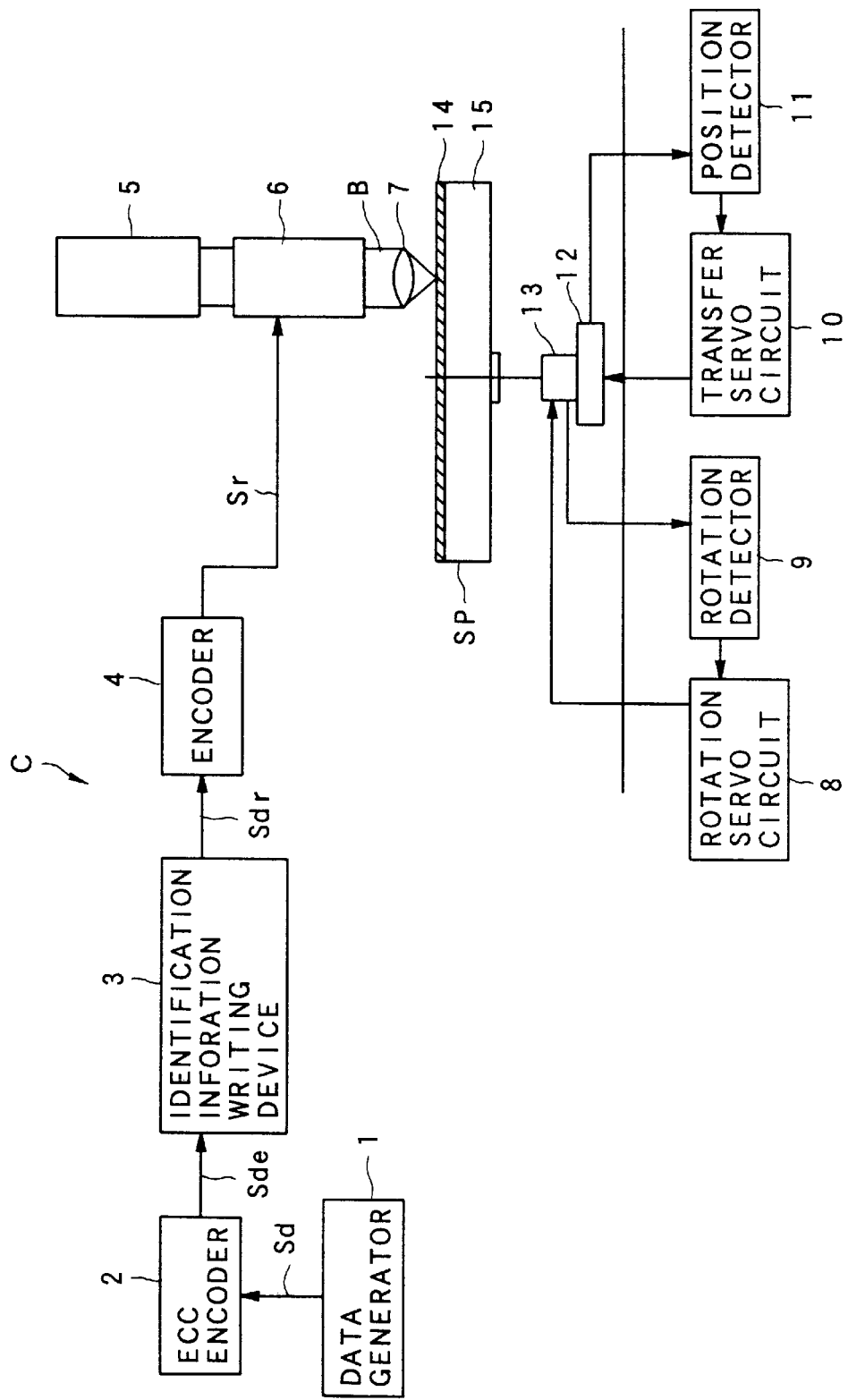
FIG. 1 is a block diagram showing a schematic construction of a cutting apparatus as a first embodiment of the present invention.

As shown in FIG. 1, a cutting device C as the embodiment is provided with a data generator 1 servicing as one example of an encipher device, an ECC (Error Correcting Code) encoder 2 servicing as one example of an adding device, an identification information writing device 3 servicing as one example of a replacing device, an encoder 4, a laser generator 5, an optical modulator 6, an objective lens 7, a spindle motor 13, a rotation detector 9, a rotation servo circuit 8, a transferring unit 12, a position detector 11 and a transfer servo circuit 10.

A stamper disc SP is provided with a resist 14 and a glass substrate 15. The resist 14 is exposed to a light when a light beam B described later is radiated to the resist 14 to thereby form a pit having a shape corresponding to a change of a strength (i.e., a light intensity) of the light beam B.

Next, a schematic operation will be explained.

The data generator 1 applies a process of generating a data sector describe later and the like to data, which are to be recorded on an DVD (e.g., video information, audio information, data to be utilized in a computer and the like), and then outputs the generated data to the ECC encoder 2 as a data signal Sd.

Then, the ECC encoder 2 generates an ECC block described later of the data included in the data signal Sd to be recorded on the DVD, and outputs the generated ECC block to the identification information writing device 3 as an addition data signal Sde.

Then, the identification information writing device 3 replaces a part of the ECC block included in the addition data signal Sde with identification information described later (i.e., identification data indicating that the data to be recorded on the DVD is legal data (which is not illegally copied)) to generate a replacement data signal Sdr.

Then, the encoder 4 applies an interleave and an 8–16 modulation to the ECC blocks included in the replacement data signal Sdr to generate a record data signal Sr.

On one hand, the laser generator 5 radiates onto the stamper disc SP the light beam B for generating the pits as the information pit on the DVD.

At this time, the optical modulator 6 strength-modulates (i.e., intensity-modulates) the light beam B radiated from the laser generator 5 by using the record data signal Sr.

Next, the objective lens 7 collects the strength-modulated light beam B onto the resist 14 of the stamper disc SP.

At this time, the spindle motor 13 rotates the stamper disc SP.

The rotation detector 9 detects a rotational number of the stamper disc SP.

Accordingly, the rotation servo circuit 8 servo-controls the rotation of the stamper disc SP on the basis of the detected rotational number.

In order to form on the stamper disc SP a spiral or coaxial track on which the pits are aligned, the transferring unit 12 moves the spindle motor 13 and the stamper disc SP in a radial direction of the stamper disc SP in accordance with the rotation of the stamper disc SP.

At this time, the position detector 11 detects the position of the transferring unit 12.

Then, the transfer servo circuit 10 servo-controls the movement of the transferring unit 12 on the basis of the detected position of the transferring unit 12.

The above mentioned operations enable the formation of the pits corresponding to the record data signal Sr on the spiral or coaxial track of the resist 14 of the stamper disc SP. Thus, the stamper disc SP is completed which services as a punching die to manufacture the DVD.

After that, the so-called replication processes, such as a resin molding, a formation of a reflection film, a formation of a protective layer and the like are executed by using the stamper disc SP. Then, the mass production of the DVD is performed, each servicing as a replica disc having the pits corresponding to the record data signal Sr.

Figure 2:
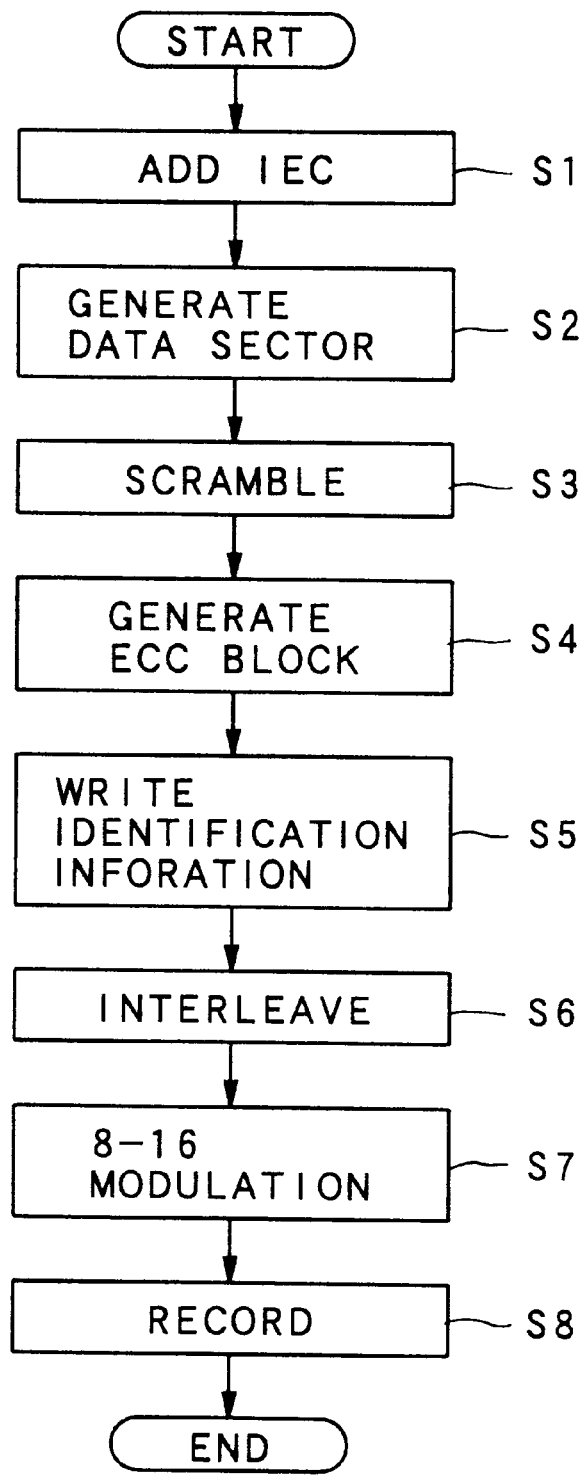
FIG. 2 is a flow chart showing a cutting operation of the cutting apparatus in the first embodiment.

Next, the detailed operations to generate the record data signal Sr according to the present invention are explained with reference to FIGS. 1 to 5. FIG. 2 is a flowchart showing the operations. FIGS. 3A to 5 are diagrams showing a configuration of the data generated by the operations (i.e., the data included in the record data signal Sr).

When the record data signal Sr is generated by the cutting device C in the first embodiment, a structure of raw data to be recorded is firstly changed into a configuration including a plurality of information units referred to as "data sectors".

That is, as shown in FIG. 2, the raw data to be recorded is firstly divided into data portions, each having 2048 bytes. An ID information indicative of a start position of the data sector and an ID information error correction code (IEC (ID Data Error correction Code)) are added to each divided data portion, (Step S1).

Next, a spare data and an error detection code (EDC) to detect an error in the divided data of 2048 bytes are added to the data generated at the step S1. Accordingly, one data sector is generated (Step S2).

Figures 3A, 3B:
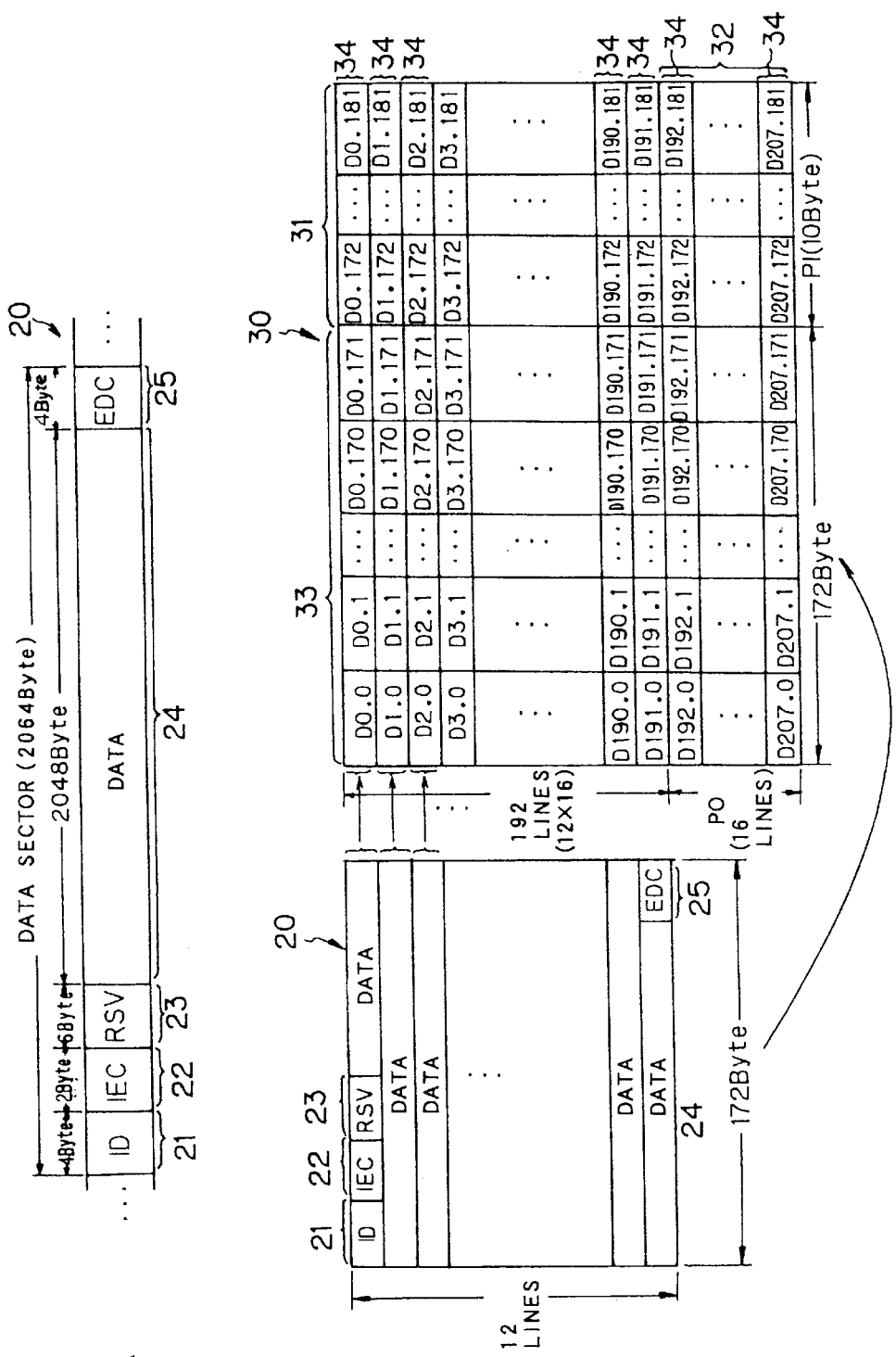
FIG. 3A is a diagram showing a data structure of a data sector in the first embodiment.
FIG. 3B is a diagram showing a data structure of an ECC block in the first embodiment.

Now, the actual configuration of the data sector is explained. As shown in FIG. 3A, an ID information 21, an ID information error correction code 22, a spare data 23, a data 24 divided from the raw data and an error detection code 25 are generated in this order from a lead of one data sector 20. Then, the data to be recorded is composed of a plurality of consecutive data sectors 20.

In FIG. 2 again, after the data sectors 20 are generated, the scramble modulation is applied to the data 24 by using a predetermined key data (Step S3).

The processes at the steps S1 to S3 are executed by the data generator 1 to then output the data signal Sd including the scramble-modulated data 24. Incidentally, the key data used for the scramble is recorded as the data 24 together with other video information and the like.

Next, the ECC encoder 2 uses the data sectors 20 included in the data signal Sd generates the ECC block servicing as one example of a correction unit in an error correction performed when the data recorded on the DVD is reproduced, and then outputs the addition data signal Sde including the ECC block to the identification information writing device 3 (Step S4).

Now, the process of generating the ECC block is explained in detail. As shown in FIG. 3B, one data sector 20 is firstly divided for each 172 bytes. The respective divided data (hereafter, each data is referred to as a data block 33) are aligned in a vertical direction (refer to a left side of FIG.3B). At this time, 12 lines of the data blocks 33 are aligned in the vertical direction.

For each of the data blocks 33 aligned in the vertical direction, an ECC-INNER code 31 of 10 bytes (which is also referred to as a PI (Parity In) code and implies an error correction code to correct the data corresponding to one horizontal line in the ECC block) is added to an end of the data block 33. Accordingly, one correction block 34 is constituted (refer to a right side of FIG. 3B). At this stage, the correction blocks 34 of 12 lines, each having the ECC-INNER code 31 at the end thereof, are aligned in the vertical direction. After that, this process is repeated for the 16 data sectors 20. Accordingly, the correction blocks 34 of 192 lines are generated.

Then, the correction blocks 34 of 192 lines are divided from the beginning thereof in the vertical direction for each byte in the condition that the correction blocks 34 of 192 lines are aligned in the vertical direction. The 16 ECC-OUTER codes (each code is also referred to a PO (Parity Out) code and implies an error correction code to correct the data corresponding to one vertical column in the ECC block) 32 are added to the respective divided data. The ECC-OUTER code 32 is also added to the ECC-INNER code 31 in the correction block 34.

The above mentioned processes enable an ECC block 30 including the 16 data sectors 20 to be generated as shown in the right side of FIG. 3B. Then, the addition data signal Sde including the ECC block 30 is outputted to the identification information writing device 3.

At this time, the total amount of the information included in the one ECC block 30 is expressed as following.

$$(172+10) \text{ bytes} \times (192+16) \text{ rows} = 37856 \text{ bytes} \qquad (2)$$

Among that, the amount of the actual data 24 is expressed as following.

$$2048 \text{ bytes} \times 16 = 32768 \text{ bytes} \qquad (3)$$

In the ECC block 30 shown in the right side of FIG. 3B, the data of one byte is represented by "D#. *". For example, "D1. 0" represents the data of one byte located at the $1^{st}$ line and the $0^{th}$ column. "D190. 170" represents the data of one byte located at the $190^{th}$ line and the $170^{th}$ column. Thus, the ECC-INNER codes 31 are located from the $172^{nd}$ column to the $181^{st}$ column, and the ECC-OUTER codes 32 are located from the $192^{nd}$ line to the $207^{th}$ line.

Moreover, the one correction block 34 is consecutively recorded on the DVD (on the stamper disc SP).

Here, the reason why the ECC block 30 is constituted so as to include both of the ECC-INNER code 31 and the ECC-OUTER code 32 as shown on the right side of FIG.3B is that the data aligned in the horizontal direction on the right side of FIG.3B is corrected by using the ECC-INNER codes 31, and the data aligned in the vertical direction on the right side of FIG.3B is corrected by using the ECC-OUTER codes 32.

That is, dual error corrections in the horizontal and vertical directions can be performed in the ECC block 30 shown on the right side of FIG. 3B. Thus, the error correction may be powerfully performed as compared with the error correction process used in the conventional CD or the like.

Now, this aspect is explained more actually. For example, even if one correction block 34 (as mentioned above, it is constructed by the data of totally 182 bytes including the ECC-INNER codes 31 corresponding to one line and are consecutively recorded on the DVD) are entirely broken by a scratch of the DVD and the like, when it is seen from the vertical direction, it is only the break of the data of one byte for a column of ECC-OUTER codes 32. Hence, if the ECC-OUTER codes 32 at the respective columns are used to perform the error correction, even if the one correction block 34 is entirely broken, it is still possible to correctly perform the error correction to accurately perform the reproduction.

In FIG. 2 again, the identification information writing device 3 replaces a part of the above generated ECC block 30 with the identification information indicating that the data to be recorded by the cutting device C is the legal (original) data and is not illegally copied (Step S5).

Now, this replacing process is explained with reference to FIG. 4. In this embodiment, in the ECC block 30, 12 bytes located from the upper left end to the bottom (that is, from a position at the $192^{nd}$ line and the $172^{nd}$ column to a position at the $203^{rd}$ line and $172^{nd}$ column in the ECC block 30) in the portion where the ECC-INNER codes 31 and the ECC-OUTER codes 32 overlap to each other (i.e., the bottom right portion in the one ECC block 30) are replaced with the identification information 35 (typically, it may be referred to as a "water mark").

Incidentally, a position in the ECC block 30 into which the identification information 35 is inserted is stored in a (legal) information reproducing apparatus (described later) by which the data recorded on the DVD is to be reproduced.

In FIG. 2 again, after the identification information 35 is written at the step S5 of FIG. 2, the replacement data signal Sdr constituted by an ECC block 30' including therein the identification information 35 is outputted to the encoder 4.

Then, the encoder 4 applies the interleave and the 8–16 modulation to the ECC block 30' included in the replacement data signal Sdr, to output the record data signal Sr (Steps S6 and S7).

The processes at the steps S6 and S7 are actually explained with reference to FIG. 5. Incidentally, data represented by "D#. *" in FIG. 5 corresponds to the data described on the right side of FIG. 3B.

Figure 5:
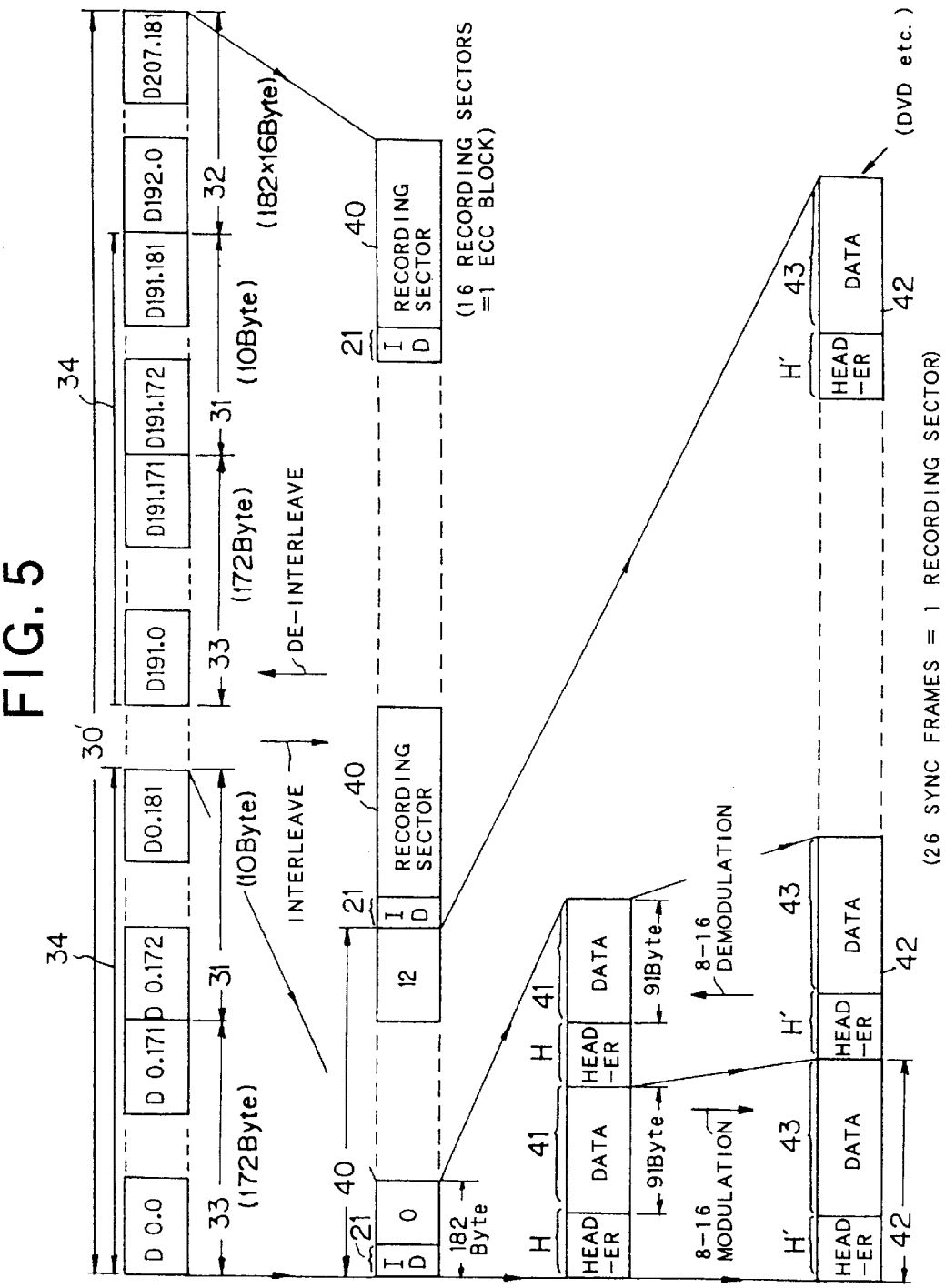
FIG. 5 is a diagram showing a physical format of data in the first embodiment.

At first, when the interleave is applied to the ECC block 30' at the step S6, the ECC blocks 30' are firstly aligned in a horizontal direction for each correction block 34, as shown in a top stage of FIG. 5. The interleave is performed by realigning the aligned data under a certain rule. Then, information corresponding to the ECC blocks 30' is divided into 16 recording sectors 40. At this time, one recording sector 40 includes information of 2366 bytes (37856 bytes÷16). The data sectors 20 and the ECC-INNER code 31 or the ECC-OUTER code 32 and the identification information 35 are mixed in the one recording sector 40. However, the ID information 21 in the data sector 20 is located at the lead of each recording sector 40 (refer to FIG. 3A).

The one recording sector 40 is divided into data portions 41 each having 91 bytes. A header H is added to each data portion 41. After that, the application of the 8–16 modulation to the recording sector 40 in the above mentioned state enables a synchronization frame 42 to be generated for each data portion 41. At this time, the synchronization frame 42 is composed of a header H' and a data 43. The amount of the information within the synchronization frame 42 is expressed as following.

$$91 \text{ bytes} \times 8 \times (16/8) = 1456 \text{ bytes} \quad (4)$$

The information is written onto the DVD in a condition that the synchronization frames 42 are consecutive. At this time, the one recording sector 40 includes 26 synchronization frames 42.

Since the above mentioned format is constituted and then the data is recorded on the DVD (i.e., the stamper disc SP), the applications of an 8–16 demodulation and a de-interleave (refer to FIG. 5) when the data is reproduced enables the original ECC blocks 30' to be reconstructed. Thus, the above mentioned powerful error correction enables the information to be accurately reproduced.

(B) Information Reproducing Apparatus

A first embodiment of an information reproducing apparatus for reproducing the data on the DVD, which is manufactured by using the stamper disc SP on which the data is recorded by the cutting device C, is explained with reference to FIGS. 6 and 7. Incidentally, the information reproducing apparatus explained below is an information reproducing apparatus which, in case that both of the video information and the audio information are recorded on the DVD as data, has a function of reproducing both of the video information and the audio information.

At first, a configuration of the information reproducing apparatus in the first embodiment is explained with reference to FIG. 6.

Figure 6:
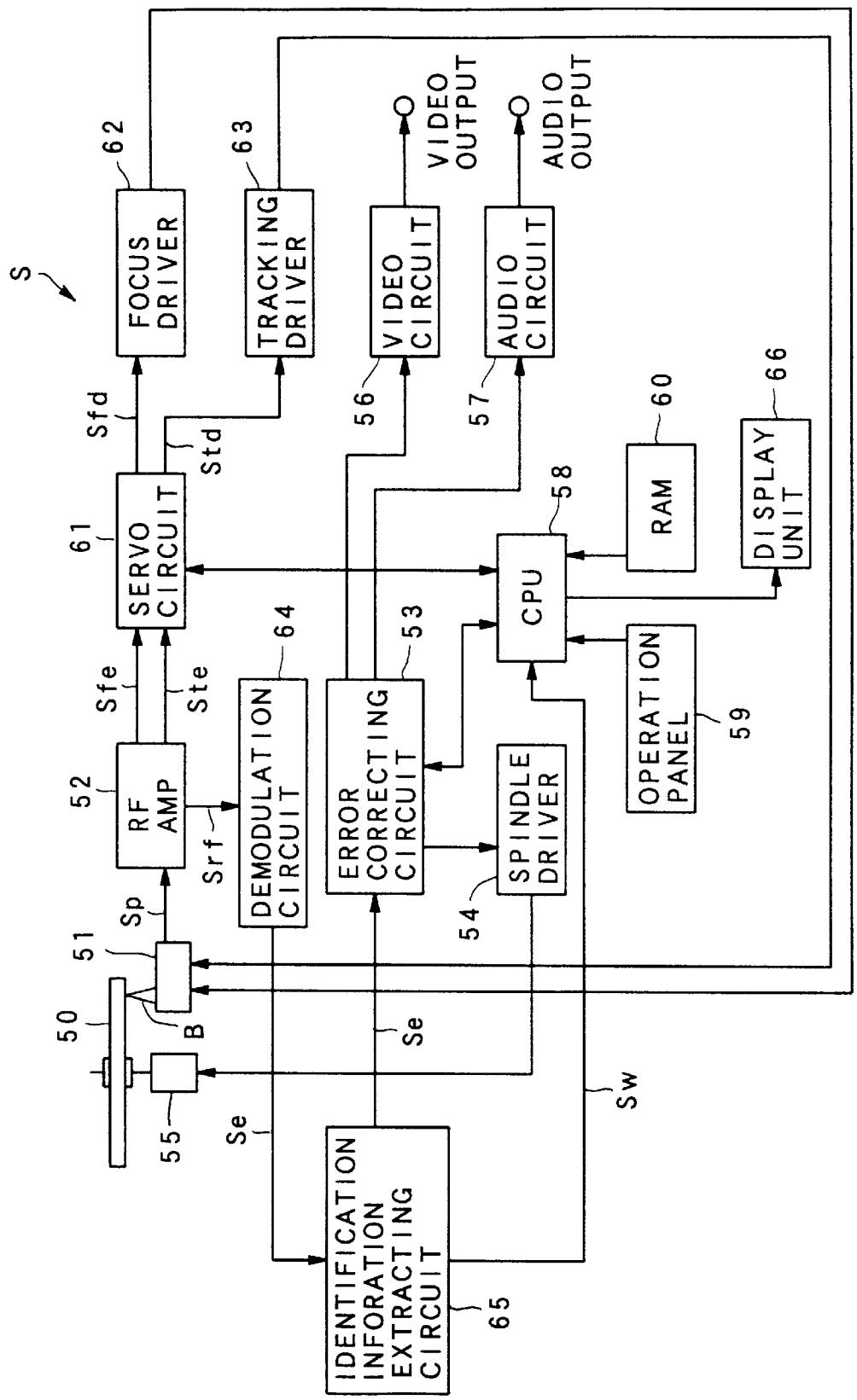
FIG. 6 is a block diagram showing a schematic construction of a reproducing apparatus in the first embodiment.

As shown in FIG. 6, an information reproducing apparatus S in the first embodiment is provided with an optical pickup 51 servicing as one example of a detecting device, an RF (Radio Frequency) amplifier 52, an error correcting circuit 53 servicing as one example of an error correcting device, a spindle driver 54, a spindle motor 55, a video circuit 56 servicing as one example of a reproducing device, an audio circuit 57 servicing as another example of a reproducing device, a CPU 58 servicing as one example of a judging device, an operation panel 59, an RAM (Random Access Memory) 60, a servo circuit 61, a focus driver 62, a tracking driver 63, a demodulation circuit 64 servicing as another example of a reproducing device, an identification information extracting circuit 65 servicing as one example of an extracting device and a display unit 66.

Next, schematic operations will be explained.

A DVD 50 manufactured by using the stamper disc SP is loaded on a turn table (not shown) and rotated by the spindle motor 55.

Then, the optical pickup 51 radiates to the DVD 50, which is being rotated, a light beam B so as to reproduce the record information. A detection signal SP corresponding to the pits formed on the DVD 50 is generated on the basis of a reflection light of the radiated light beam B and is outputted to the RF amplifier 52.

Then, on the basis of the detection signal Sp, the RF amplifier 52 generates an RF signal Srf corresponding to the data recorded on the DVD 50, generates a tracking error signal Ste indicative of a displacement of a position of the light spot generated on an information record surface of the DVD 50 by the radiation of the light beam B from a track composed of the pits on the DVD 50, and generates a focus error signal Sfe indicative of a displacement of a focus position of the light beam B from the information record surface. Then, the RF amplifier 52 outputs the generated RF signal Srf to the demodulation circuit 64, and also outputs the generated tracking error signal Ste and the generated focus error signal Sfe to the servo circuit 61.

Accordingly, the servo circuit 61 generates a tracking drive signal Std to servo-drive an objective lens (not shown), which collects the light beam B onto the information record surface of the DVD 50, in a direction parallel to the information record surface such that the position of the light spot coincides with that of the track, under the control of the CPU 58, on the basis of the tracking error signal Ste. Then, the servo circuit 61 outputs the generated tracking drive signal Std to the tracking driver 63.

In parallel to this, the servo circuit 61 generates a focus drive signal Sfd to serve-drive the objective lens in a direction vertical to the information record surface, such that a beam collecting position of the light beam B coincides with the information record surface of the DVD 50, under the control of the CPU 58, on the basis of the focus error signal Sfe. Then, the servo circuit 61 outputs the generated focus drive signal Sfd to the focus driver 62.

The tracking driver 63 and the focus driver 62 apply processes, such as an amplifying process and the like, to the tracking drive signal Std and the focus drive signal Sfd, respectively. Then, the tracking driver 63 and the focus driver 62 output the processed signals to an actuator (not shown) in the optical pickup 51 and drive it to thereby servo-control the position of the light spot and the beam collecting position of the light beam B.

On one hand, the demodulation circuit 64 to which the RF signal Srf is inputted applies the de-interleave and the 8–16 demodulation (refer to FIG. 5) to the RF signal Srf and then generates a reproduction signal Se and further outputs it to the identification information extracting circuit 65.

Then, the identification information extracting circuit 65 extracts, from the reproduction signal Se, a part of the data which is supposed to include the identification information 35 (i.e., the data at a position which is supposed to include the identification information 35 in the one ECC block) as described later. Then, the identification information extracting circuit 65 outputs the extracted part to the CPU 58 as an identification information signal Sw, and further outputs the inputted reproduction signal Se directly to the error correcting circuit 53.

The error correcting circuit 35 applies an error correcting process using the ECC-INNER code 31 and the ECC-OUTER code 32 to the ECC blocks 30' included in the inputted reproduction signal Se, under the control of the CPU 58. Further, the error correcting circuit 35 separates the error-corrected data into the video information and the audio information, and then outputs a video signal including the video information to the video circuit 56 and outputs an audio signal including the audio information to the audio circuit 57.

Accordingly, the video circuits 56 restores the inputted video signal to the original video signal and outputs it to and displays it on a monitor (not shown) and the like. The audio circuit 57 restores the inputted audio signal to the original audio signal and outputs it to a speaker (not shown) and the like.

On the other hand, the error correcting circuit 53 detects a phase difference between a phase of the reproduction signal Se and a phase of a predetermined standard reproduction clock signal, in parallel to the above mentioned error correcting process. Then, the error correcting circuit 53 outputs a phase difference signal to the spindle driver 54. Then, the spindle driver 54 servo-controls a rotational number of the spindle motor 55 on the basis of the phase difference signal.

The CPU 58 controls the information reproducing apparatus S as a whole, in addition to the above mentioned controls to the respective constitutional elements. At this time, the information necessary for the control processes are inputted from the external through the operation panel 59.

Moreover, the information necessary for the control processes is transiently stored in the RAM 60, and is read out to the CPU 58 as the occasion demands.

The operational states of the information reproducing apparatus S and the like are displayed on the display unit 66, such as a liquid crystal display or the like, as the occasion demands.

Next, the reproduction operations of the data recorded on the DVD 50 according to the present invention will be explained with reference to FIGS. 6 and 7. FIG. 7 is a flowchart showing the reproduction operations.

Figure 7:
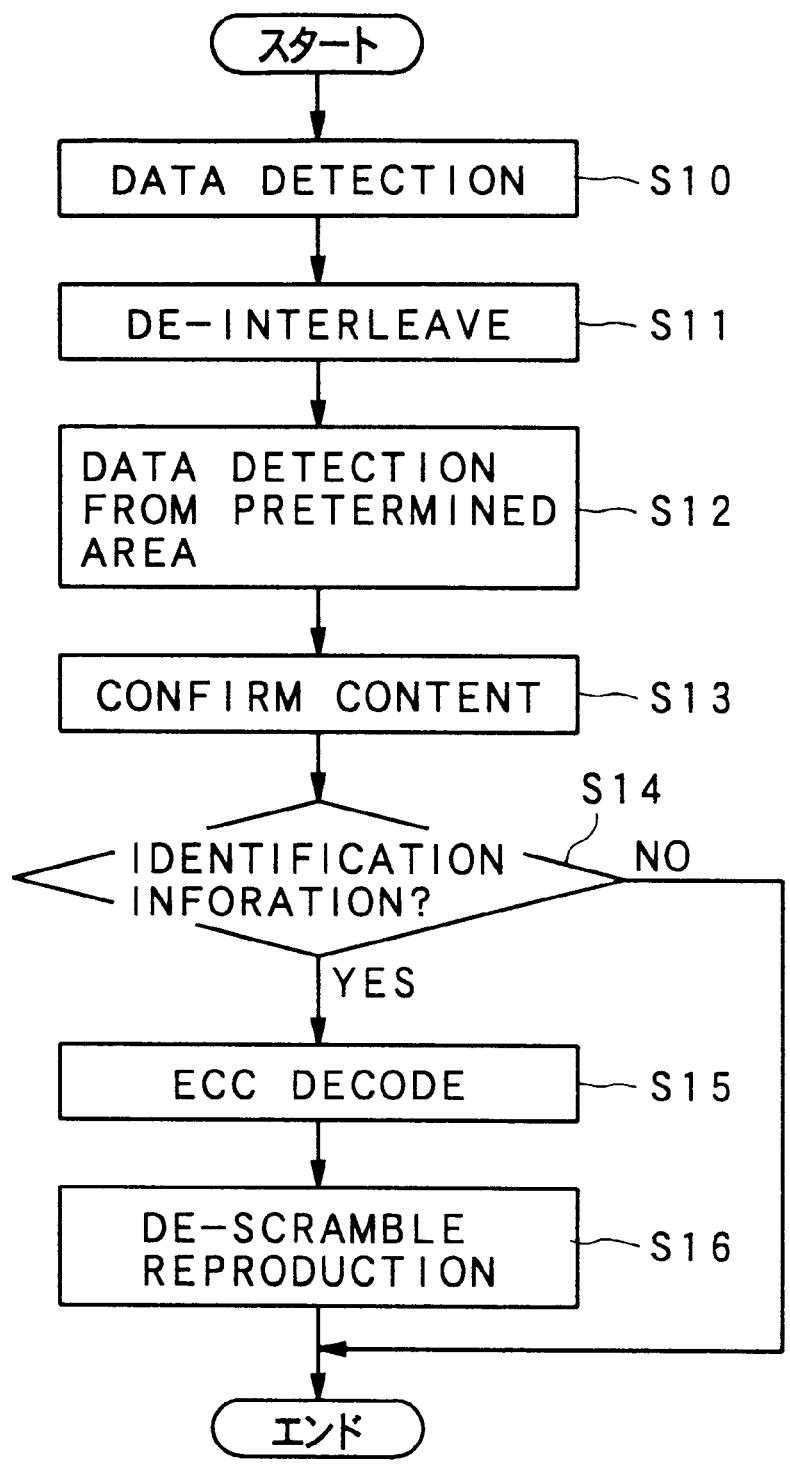
FIG. 7 is a flow chart showing a reproducing operation of the reproducing apparatus in the first embodiment.

In the reproducing operation, as shown in FIG. 7, the light beam B is firstly radiated from the optical pickup 51 onto the DVD 50. Then, the reflection light thereof is used to reproduce the data recorded on the DVD 50 (Step S10). At this time, the focus error signal Sfe and the tracking error signal Ste are generated by the RF amplifier 52 and are outputted to the servo circuit 61. Also, the RF signal Srf is generated and is outputted to the demodulation circuit 64.

Next, the demodulation circuit 64 applies the de-interleave and the 8–16 demodulation to the RF signal Srf (Step S11). Accordingly, the reproduction signal Se is generated.

Figure 4:
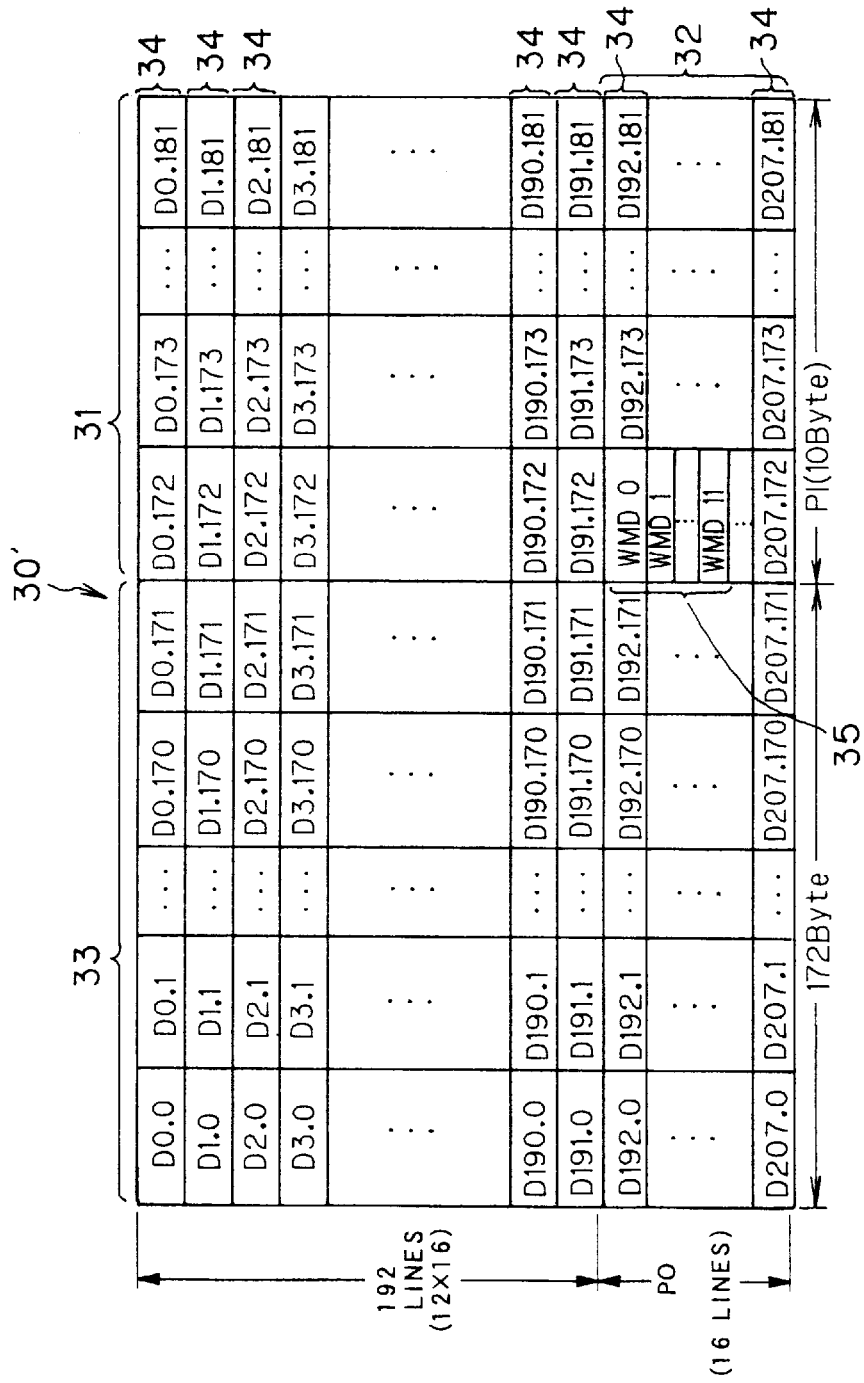
FIG. 4 is a diagram showing an ECC block after inserting the identification information in the first embodiment.

At the stage of the reproduction signal Se, the data detected from the DVD 50 is kept in the condition that it includes the plurality of ECC blocks 30' shown in FIG. 4 by the de-interleave and the 8–16 demodulation.

Next, the identification information extracting circuit 65 detects the data at the area where the identification information 35 is recorded (in the case of the DVD 50 replicated by using the stamper disc SP manufactured by the cutting device C, this area is ranging from a position at the $192^{nd}$ line and the $172^{nd}$ column to a position at the $203^{rd}$ line and the $172^{nd}$ column in the one ECC block 30'. Incidentally, the fact that the identification information 35 is included in this area is stored in advance in the CPU 58) from among the ECC block 30 within the reproduction signal Se. Then, the data is outputted to the CPU 58 as the identification information signal Sw (Step S12).

Moreover, in parallel to this process, the identification information extracting circuit 65 outputs the inputted reproduction signal Se directly to the error correcting circuit 53.

Next, the CPU 58 confirms a content of the data included in the inputted identification information signal Sw (Step S13). Then, it is judged whether or not the data is the identification information 35, namely, whether or not the identification information 35 is included in the reproduced ECC blocks 30' (Step S14).

If it is judged by the judgment at the step S14 that the data included in the identification information signal Sw is the identification information 35 (Step S14; YES), it is judged that the data recorded on the DVD 50 is the legally (originally) recorded data, i.e., it is not the illegally copied data. Then, the error correcting circuit 53 error-corrects the data included in the reproduction signal Se, under the control of the CPU 58, by using the ECC-INNER codes 31 and the ECC-OUTER codes 32 within the ECC blocks 30', and further generates the video signal to be outputted to the video circuit 56 and the audio signal to be outputted to the audio circuit 57 (Step S15).

Incidentally, the identification information 35 within the ECC blocks 30' is treated as an error and is corrected in the error correction performed by the error correcting circuit 53. Thus, the identification information 35 is erased from the reproduced data. This reason is described below. That is, the identification information 35 is obtained by replacing the part of the data at the portion, where the ECC-OUTER code 32 and the ECC-INNER code 31 for the error correction overlap to each other, with the original data which is not used for the error correction. Hence, the identification information 35 is treated as the error in the error correction performed by the error correcting circuit 53.

When the error correction to the data within the reproduction signal Se is ended at the step S15, the generated video signal is de-scrambled by the video circuit 56 and is outputted to a monitor (not shown) and the like as the video image. Moreover, the audio signal is reproduced by the audio circuit. 57 and is outputted to a speaker (not shown) (Step S16). Incidentally, the de-scramble performed by the video circuit 56 is executed by using the key data which is recorded together with other videos and the like as the data 24.

On the other hand, if it is judged by the judgment at the step S14 that the identification information 35 is not detected (Step S14; NO), it is judged that the data recorded on the DVD 50 is not the legally recorded data and thereby it is the illegally copied data. Thus, the process of reproducing the data is not executed, and the process is ended.

As explained above, according to the operations of the cutting device C and the information reproducing apparatus S in the first embodiment of the illegal copy preventing system, the error-corrected reproduction signal Se is reproduced only when the identification information 35 is detected. Hence, the data without the identification information 35 (that is, the illegally copied data) can be protected from being illegally reproduced.

Moreover, since the part of the ECC block 30 to which the ECC-INNER code 31 and the ECC-OUTER code 32 are added is replaced with the identification information 35, the identification information 35 is erased by the error correction at the time of the reproduction. Accordingly, the identification information 35 is not recorded any longer when the reproduced data is recorded in other information recording apparatus. Therefore, the data recorded in the other information recording apparatus can be protected from being reproduced, if the data can be reproduced only when the identification information 35 is detected.

Furthermore, since the part of the portion where the ECC-INNER code 31 and the ECC-OUTER code 32 overlap to each other is replaced with the identification information 35, the ECC-INNER code 31 and the ECC-OUTER code 32 which are used for the error correction of the data itself to be essentially reproduced are not replaced with the identification information 35. Hence, the ability of the error correction to the data itself is not degraded.

(II) Second Embodiment of Illegal Copy Preventing System

Next, a second embodiment of an illegal copy preventing system according to the present invention is explained with reference to FIGS. 8 to 13.

(A) Cutting Device

At first, an embodiment of the cutting device in the second embodiment of the illegal copy preventing system (hereinafter, it is simply referred to as a second embodiment) is explained with reference to FIGS. 8 to 11.

In FIGS. 8 to 11 of the second embodiment described below, the same constitutional elements as those in the cutting device C of the first embodiment (in FIGS. 1 to 7) carry the same reference numerals and the detailed explanation thereof are omitted.

Although in the aforementioned cutting device C in the first embodiment, only the identification information 35 is inserted in the ECC block 30, (i) version information, (ii) key data for scramble-modulating the data to be recorded onto the DVD 50 by the data generator 1 and (iii) position information indicating the position of the inserted identification information 35 in the ECC block 30, which are described later in detail, are inserted in the ECC block 30 as certification information in addition to the identification information 35 in case of the cutting device of the second embodiment.

Further, each information inserted as the certification information is inserted in not only the area where the ECC-INNER code and the ECC-OUTER code are overlapped to each other but also other data area in the ECC block 30.

Figure 8:
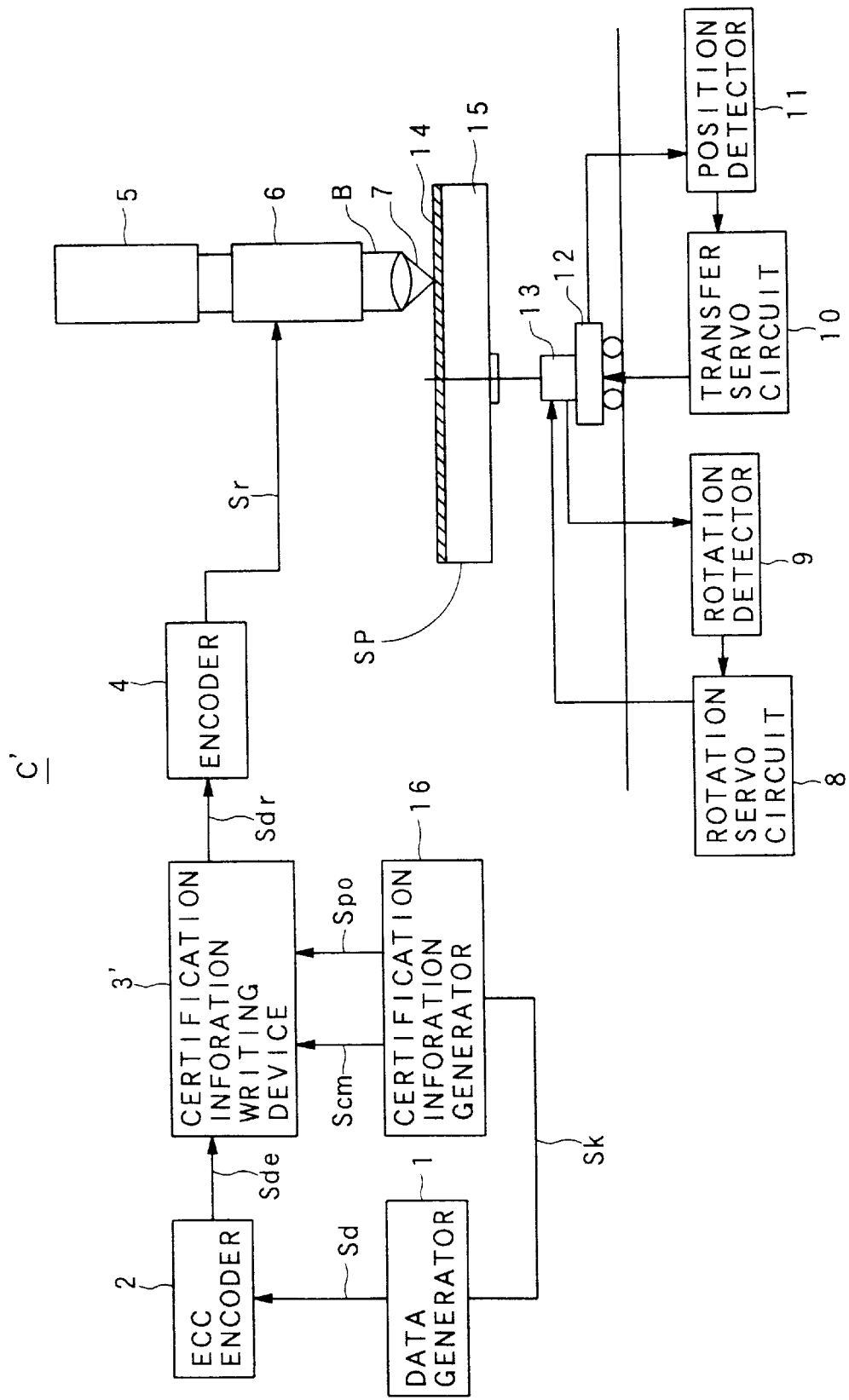
FIG. 8 is a block diagram showing a schematic construction of a cutting apparatus as a second embodiment of the present invention.

Namely, as shown in FIG. 8, a cutting device C' in the second embodiment is provided with: a certification information writing device 3' servicing as one example of the replacing device instead of the identification information writing device 3 of the cutting device C in the first embodiment: and a certification information generator 16 for generating the certification information to be inserted into the ECC block 30.

The structure and the operation other than that are the same as those of the cutting device C in the first embodiment.

At this time, the certification information generator 16 is provided with: a key data generator 70; an encipher unit 71 servicing as one example of an encipher key inserting device; an identification information generator 72, a version information generator 73; a synthesize unit 74, a rearrange unit 75 servicing as one example of a rearrange device; a divide unit 76; a division controller 77; a correction code add unit 78 servicing as one example of an adding device; and a position information generator 79.

Figure 10:
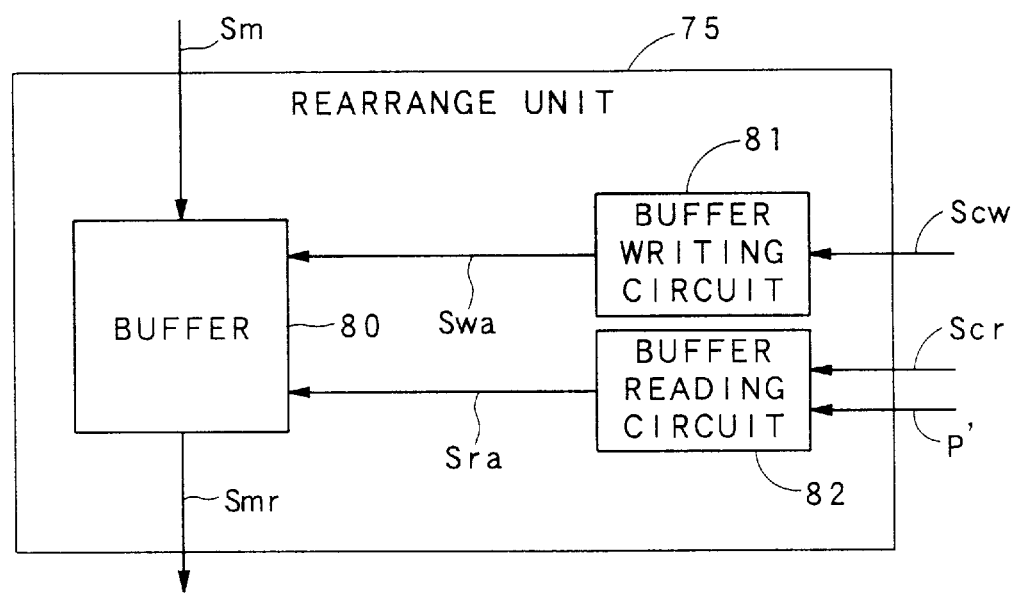
FIG. 10 is a block diagram showing a detailed structure of a rearrange unit in the second embodiment.

Further, as shown in FIG. 10, the rearrange unit 75 is provided with a buffer 80, a buffer writing circuit 81 and a buffer reading circuit 82.

Figure 9:
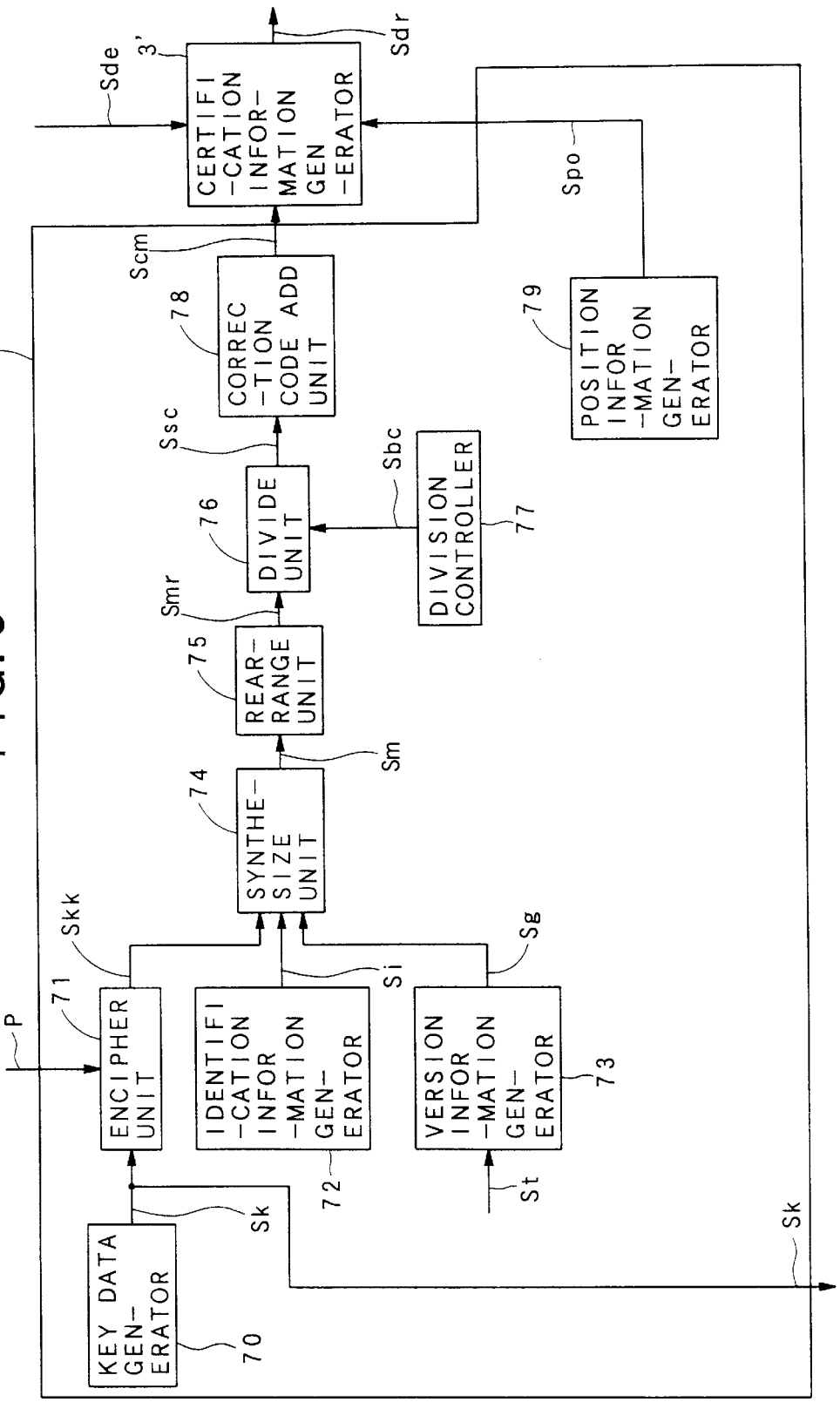
FIG. 9 is a block diagram showing a detailed structure of a certification information generator in the second embodiment.

Next, the operation of the certification information generator 16 and the operation of the certification information writing device 3' in accompaniment to that are explained with reference to FIGS. 9 to 11.

At first, the key data generator 70 generates key data which is used for the scramble-modulation in the data generator 1, and outputs it as a key data signal Sk to the encipher unit 71 and also to the data generator 1.

Then, on the basis of this key data signal Sk, the data generator 1 perform the scramble-modulation by use of the scramble method, which is changed in accordance with a procedure set in advance for each time set in advance on the basis of the time measured in the cutting device C'.

At this time, the value of the key data can be made different each time as it is generated by a not-illustrated random number generator for example.

Then, the encipher unit 71 enciphers the key data included in the inputted key data signal Sk by the method set in advance by use of the parameter which is inputted from the external, generates enciphered key data KK and outputs it as an enciphered key data signal Skk to the synthesize unit 74.

Figure 11:
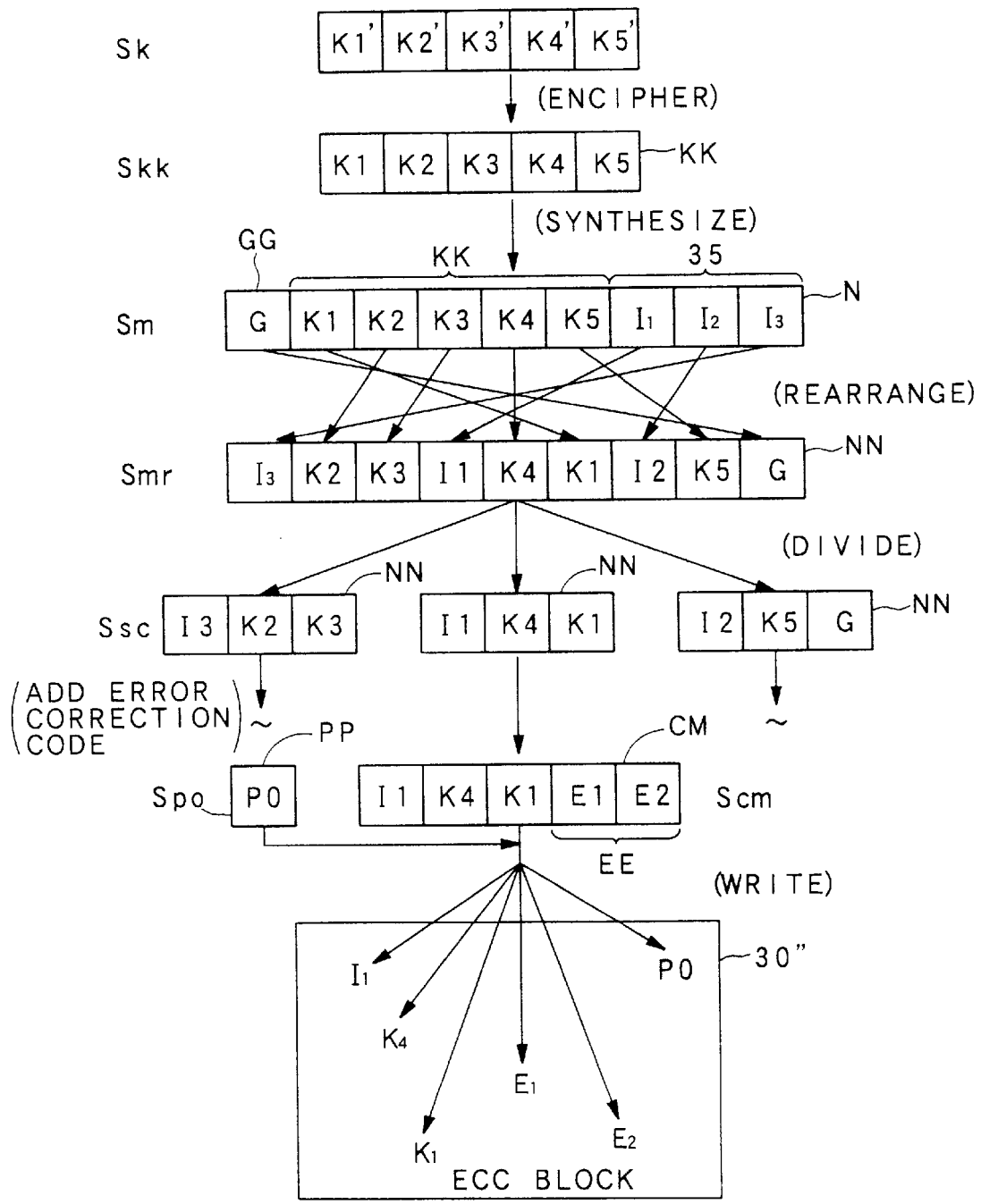
FIG. 11 is a diagram showing an operation of the cutting apparatus in the second embodiment.

Here, as shown in an uppermost stage of FIG. 11, it is assumed that the content of the key data included in the key data signal Sk is 5 bytes of ⌈K1'⌉ to ⌈K5'⌉, for example. Then, the encipher unit 71 enciphers the key data of 5 bytes for each byte by use of the parameter P, so as to generate the enciphered key data signal Skk including the encipher key data KK the content of which is the 5 bytes of ⌈K1'⌉ to ⌈K5'⌉, for example.

As the above mentioned parameter P, the production number or the identification number of the cutting device C', the production number or the identification number of the stamper disc SP which is produced, the time information or the like may be actually employed for example.

It is not necessary to perform enciphering the key data for each byte, but the key data may be enciphered for each data length unit of the key data (i.e., 5 bytes in the above mentioned example).

On the other hand, the identification information generator 72 generates the above mentioned identification information 35 to be inserted into the ECC block 30, and outputs it as an identification information signal Si to the synthesize unit 74.

Further, the version information generator 73 generates the version information indicating the above mentioned scrambling method at the present time on the basis of a time signal St corresponding to the time measured within the cutting device C', and outputs it as a version information signal Sg to the synthesize unit 74.

Then, the synthesize unit 74 synthesizes the enciphered key data signal Skk, the identification information signal Si and the version information signal Sg, generates a synthesized signal Sm and outputs it to the rearrange unit 75.

More concretely, as shown at a third stage from the top of FIG. 11, the synthesize unit 74 synthesizes the version information GG of 1 byte, whose content is "G", and the enciphered key data KK with respect to the identification information 35 included in the identification information signal Si (whose content is 3 bytes of "I1" to "I3" for example), forms the certification information N by this, and outputs it as the synthesized signal Sm to the rearrange unit 75.

Then, as shown at a fourth stage from the top of FIG. 11, the rearrange unit 75 rearranges the certification information N included in the synthesized signal Sm for each byte, generates the rearranged certification information N', and outputs it as a rearranged signal Smr to the divide unit 76.

Here, the rearranging process in the rearrange unit 75 is concretely explained with reference to FIG. 10. At first, when the synthesized signal Sm is inputted into the rearrange unit 75, the certification information N included in the synthesized signal Sm is temporarily written one after another in accordance with the designation of the writing address included in the writing address signal Swa, which is outputted from the buffer writing circuit 81, on the basis of the control signal Scw from the CPU which is not illustrated. At this time, the writing address signal Swa may include control information such as writing enable information etc., for example.

The capacity of the buffer 80 is larger than a length of one certification information N (e.g., 9 bytes in case of FIG. 11).

Then, when writing into the buffer 80 is finished, the information for each byte within the stored certified information N is rearranged randomly, in accordance with the designation of the reading address included in the reading address signal Sra, which is outputted from the buffer reading circuit 82 on the basis of the control signal Scw inputted from the CPU not illustrated as well as the parameter P' inputted from the external, and is read out as the rearranged signal Smr. At this time, the writing address signal Sra may include control information such as reading enable information etc., for example.

As this parameter P', the production number or the identification number of the cutting device C', the production number or the identification number of the stamper disc SP which is produced, the time information or the like may be actually employed in the same manner as the aforementioned parameter P.

Incidentally, in the above mentioned rearrange unit 75, although rearranging is performed upon reading out the certification information N from the buffer 80 by the reading address signal Sra, the information for each byte may be rearranged and stored upon writing the certification information N into the buffer 80 by the writing address signal Swa other than that.

Next, the divide unit 76 divides the rearranged certification information N' included in the rearranged signal Smr on the basis of the dividing method which is designated by the control signal Sbc from the division controller 77, generates a divided signal Ssc including the divided certification information NN, and outputs it to the correction code add unit 78.

At this time, as for the method of dividing the rearranged certification information N', as shown at a fifth stage from the top of FIG. 11, the rearranged certification information N' may be divided for each 3 bytes from the head thereof, or may be divided for each 2 bytes, 3 bytes and 4 bytes from the head thereof, for example.

Here, one divided certification information NN among the plurality of divided certification information NN is inserted into one ECC block 30 respectively.

Then, the correction code add unit 78 adds the error correction code of predetermined bytes onto the divided certification information NN respectively, generates a correction signal Scm including correction certification information CM, and outputs it to the certification information writing device 3'.

At this time, as shown in FIG. 11, the correction certification information CM is actually generated as the error correction codes EE of 2 bytes, whose contents are "E1" and "E2", are added onto one divided certification information NN for example.

Incidentally, in FIG. 11, only the addition of the error correction code EE as for one divided certification information NN is indicated. In fact, the error correction core EE is added onto every one of the divided certification information NN.

On the other hand, the position information generator 79 generates a position signal Spo including the position information, which indicates the position where the information of each byte included in the generated correction certification information CM is to be inserted within the ECC block 30, and outputs it to the certification information writing device 3'.

In this case, the position information is generated so as to indicate the position of each byte included in the correction certification information CM, which is to be inserted at a random position within each ECC block 30 (i.e., a random position including the area other than the ECC-INNER code 31 or the ECC-OUTER code), and so as to indicate the position to insert, which is different for each ECC block 30.

Then, as shown in the bottom stage of FIG. 11, the certification information writing device 3' replaces the data at the random position within the ECC block 30 included in the addition data signal Sde by the position information PP, which is included in the correction certification information CM and the position signal Spo and whose content is "PO", generates the ECC block 30", and outputs the replacement data signal Sdr including this ECC block 30".

At this time, the information of each byte of the correction certification information CM is inserted at the random position within the ECC block 30, which is described in the position information PP.

In this case, the position information PP is inserted at a specific position which is set in advance within the ECC block 30. This specific position is determined in advance with respect to the information reproducing apparatus described later in detail. More concretely, the specific position may be a fixed position which is set in advance on the ECC block 30. Alternatively, it is also possible to construct such that this specific position is specified on the basis of a predetermined function with the address data-at the addition data Sde of the ECC block 30 as the parameter thereof.

After that, the operation same as that of the cutting device C of the first embodiment is performed, so that the stamper disc SP is formed on which the record data signal Sr constructed by the ECC block 30" including the certification information N is recorded, and that the above mentioned DVD 50 can be mass-produced by this.

Incidentally, it is possible to construct such that a plurality of sets of the information, in which the above mentioned correction certification information CM and the position information PP are combined, are recorded at different positions within the ECC block 30. By recording the plurality of sets of information in this manner, in case that the information recorded at a certain position cannot be read out due to a scratch etc., on the DVD 50 for example, the information recorded at another position can be used as the backup information thereof.

(B) Information Reproducing Apparatus

Next, an embodiment of the above mentioned information reproducing apparatus in the second embodiment is explained with reference to FIGS. 12 and 13.

Figure 12:
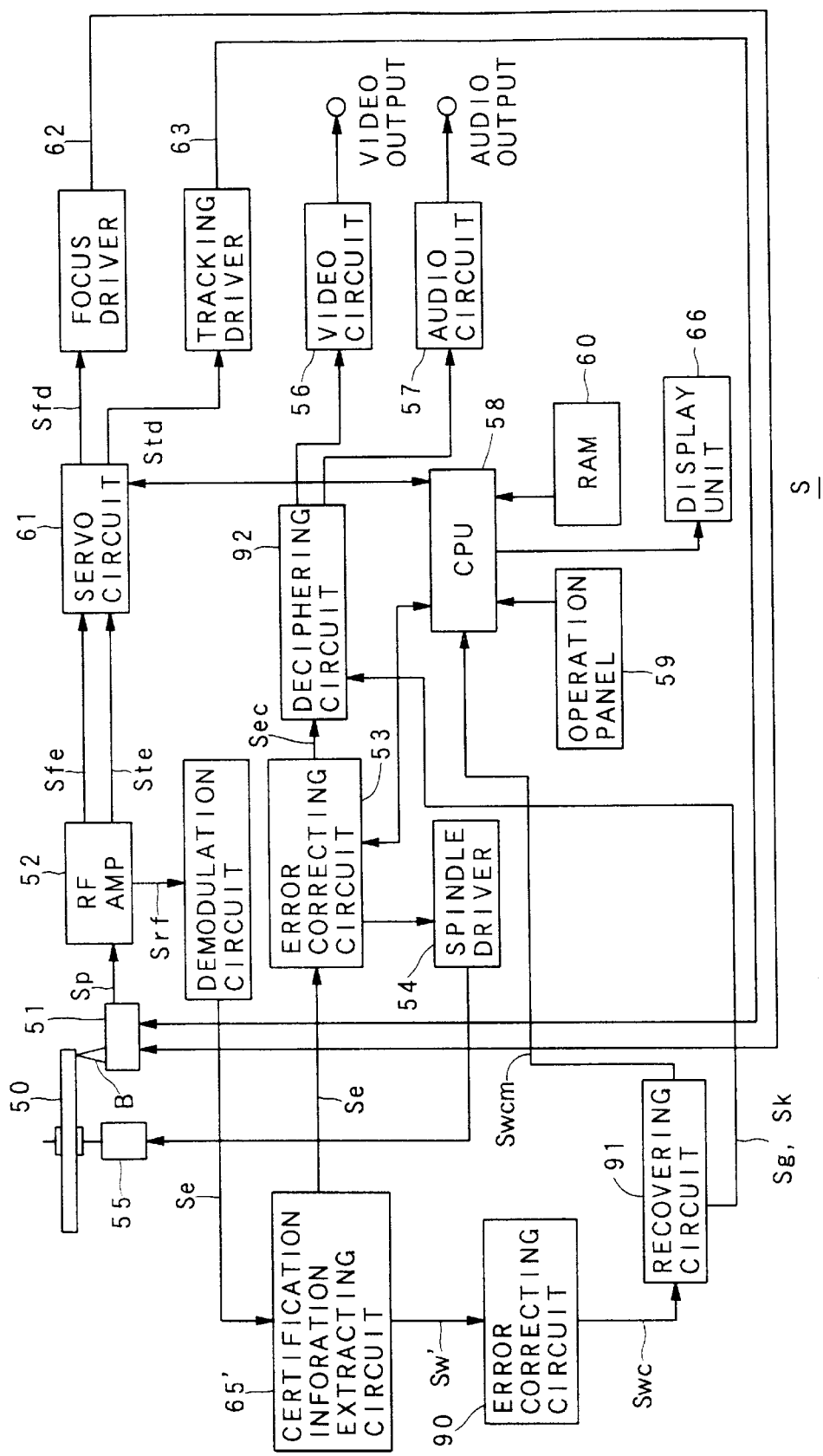
FIG. 12 is a block diagram showing a schematic construction of a reproducing apparatus in the second embodiment.
Figure 13:
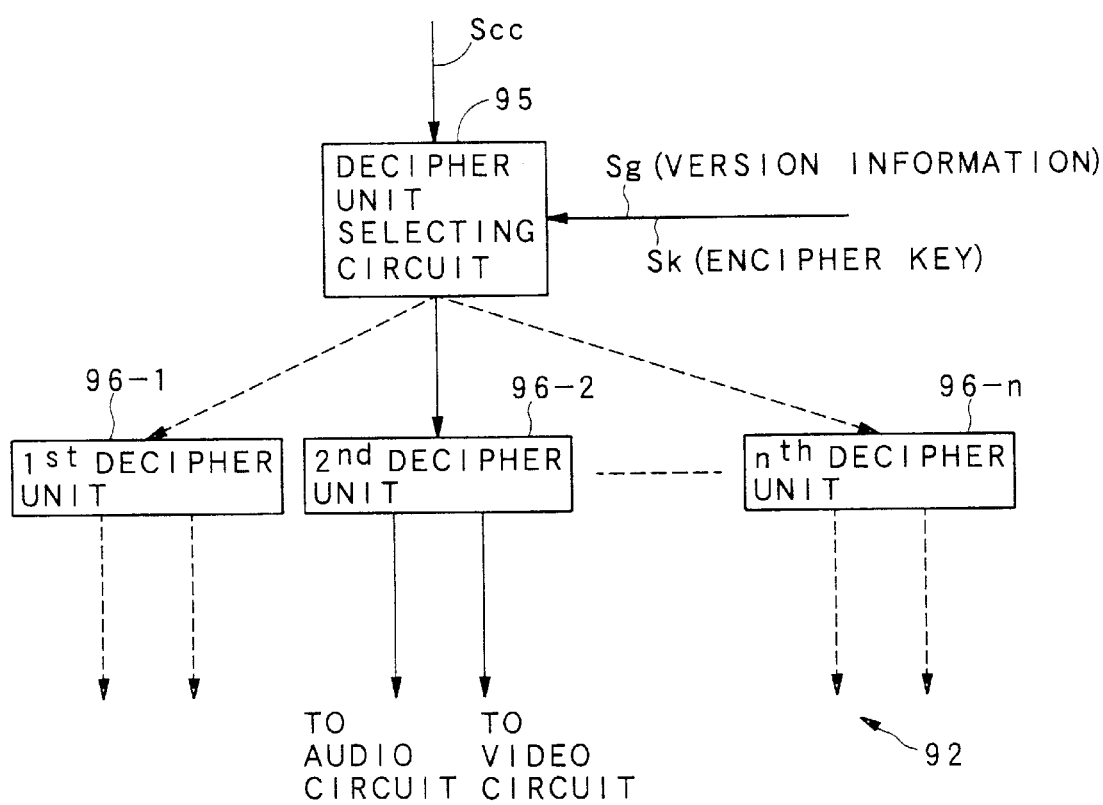
FIG. 13 is a block diagram showing a detailed structure of a decipher unit in the second embodiment.

In the second embodiment of FIGS. 12 and 13, the same constitutional elements as those in the information reproducing apparatus S of the first embodiment carry the same reference numerals and the detailed explanations thereof are omitted.

Although the reproduction signal Se reproduced from the DVD 50 is error-corrected and reproduction-outputted only on the basis of the identification information 35 in the information reproducing apparatus S of the first embodiment, the information is reproduced by use of the above mentioned version information GG, the key data KK, the identification information 35 and the position information PP which are recorded as the certification information N on the DVD 50, besides the identification information 35, in the information reproducing apparatus of the second embodiment.

Namely, as shown in FIG. 12, an information reproducing apparatus S' of the second embodiment is provided with a certification information extracting circuit 65' instead of the identification information extracting circuit 65 in the information reproducing apparatus S of the first embodiment, and is further provided, in addition to the constitutional elements of the first embodiment, with: an error correcting circuit 90, a recovering circuit 91 and a deciphering circuit 92.

The structure and the operation other than that are the same as those of the information reproducing apparatus S in the first embodiment.

As shown in FIG. 13, the deciphering circuit 92 is provided with a decipher unit selecting circuit 95 and is further provided with a $1^{st}$ decipher unit 96-1, a $2^{nd}$ decipher unit 96-2, ... and an $n^{th}$ decipher unit 96-n.

Here, each of the $1^{st}$ decipher unit 96-1, the $2^{nd}$ decipher unit 96-2, ... and the $n^{th}$ decipher unit 96-n is to perform a deciphering process corresponding to respective one of the scramble methods used for the scramble-modulating process in the data generator 1 (i.e., the scrambling process which was performed while changing the scrambling method in correspondence with the time).

Next, the operation of the information reproducing apparatus S' is explained.

At first, by the actions of the optical pickup 51, the RF amplifier 52 and the demodulation circuit 64, the reproduction signal Se is generated and is inputted into the certification information extracting circuit 65'.

At this time, the correction certification information CM and the position information PP are included in the reproduction information Se for each ECC block 30", besides the information to be reproduced.

Then, the certification information extracting circuit 65' firstly extracts the position information PP from the ECC block 30" in the reproduction signal Se (the position of the position information PP within the ECC block 30" is stored in the information reproducing apparatus S' in advance), extracts the correction certification information CM on the basis of the position information PP and outputs it as the correction certification information signal Sw' to the error correcting circuit 90.

On the other hand, the certification information extracting circuit 65' outputs the reproduction signal Se after extracting the correction certification information CM and the position information PP as it is to the error correcting circuit 53, in addition to the above mentioned action.

Next, the error correcting circuit 90 performs the error correction with respect to the correction certification information CM by use of the error correction code EE, which is included in the correction certification information CM, further collects the divided certification information NN which was divided into each ECC block 30", generates the correction signal Swc including the rearranged certification information N', and outputs it to the recovering circuit 91.

Then, the recording circuit 91 recovers the certification information N by applying a process, which is reverse to the rearranging process by the rearrange unit 75, with respect to the rearranged certification information N'.

Further, the recording circuit 91 deciphers the enciphered key data KK among the recovered certification information N, by the deciphering process corresponding to the enciphering process in the encipher unit 71, so as to generate the original key data.

Then, the recovering circuit 91 outputs the version information GG which has been included in the certification information N and the deciphered key data as the version information signal Sg and the key data signal Sk respectively to the deciphering circuit 92, generates the identification information signal Swcm including the identification information 35 which has been included in the certification information N and outputs it to the CPU 58.

By this, the CPU 58 performs the process indicated as the steps S14 and S15 in FIG. 7 on the basis of the identification certification information 35.

On the other hand, the deciphering circuit 92 deciphers the content of the corrected reproduction signal Sec which is the reproduction signal Se after the error correction and which is outputted from the error correcting circuit 53 (i.e, applies the scramble-demodulation corresponding to the scramble-modulation performed in the data generator 1, with respect to the corrected reproduction signal Sec), and separates the deciphered data into the video information and the audio information, so as to output the video signal including the video information to the video circuit 56 and output the audio signal including the audio information to the audio circuit 57.

Here, the operation of the deciphering circuit 92 is explained more concretely. Namely, the corrected reproduction signal Sec which is inputted is outputted to the decipher unit, which is selected by the decipher unit selecting circuit 95 on the basis of the version information GG, together with the key data included in the key data signal Sk.

Namely, since the designation information, which designates or specifies the scramble method in the scramble-modulation which has been performed in the data generator 1, is included in the version information GG, the decipher unit selecting circuit 95 selects the decipher unit, which has the deciphering method corresponding to this scrambling method which has been performed, on the basis of this designation information, and outputs the corrected reproduction signal Sec with respect to this selected decipher unit, together with the key data included in the key data signal Sk.

FIG. 13 indicates the condition where the $2^{nd}$ decipher unit 96-2 is selected on the basis of the version information GG.

Then, the decipher unit selected by the decipher unit selecting circuit 95 (e.g., the $2^{nd}$ decipher unit 96-2 in case of FIG. 13) deciphers the information included in the corrected reproduction signal Sec by use of the inputted key data (i.e., scramble-demodulates the information) so as to output the video signal including the video information and the audio signal including the audio information.

As described above, according to the actions of the cutting device C' and the information reproducing apparatus S', which are included in the second embodiment of the illegal copy preventing system, it is possible to extract the rearranged certification information N' by using the position information PP as the clue, even if the replacement position of the rearranged certification information N' of the ECC block 30" is changed in order to prevent the illegal copy, in addition to the effect of the action of the cutting device C and the information reproducing apparatus S of the first embodiment. Thus, by changing the replacement position of the rearranged certification information N', it is possible to prevent the rearranged certification information N' from being illegally read out before the error correction at the time of reproducing the information.

Further, since the rearranged certification information N' is generated by rearranging the content of each byte constituting the original certification information N, it is possible to prevent the original certification information N from being recognized even if the rearranged certification information N' is read out before the error correction at the time of reproducing the information.

Furthermore, the content of the enciphering process and the time of enciphering are included in the version information, and the content of the deciphering process is selected for each content of the enciphering process in accordance with the time of enciphering. Thus, even if the content of one enciphering process is leaked at the time of reproduction, it is possible to decipher the enciphered data by use of another enciphering process so as to effectively prevent the illegal copy.

Since the key data for the scramble-demodulation is included in the certification information N, the enciphered record information cannot be deciphered unless the certification information N can be obtained at the time of reproduction, so that it is possible to effectively prevent the illegal copy.

Since the certification information is erased at the time of reproduction, the key data which is once used for the scramble-demodulation at the time of reproduction is also erased. Thus, it is possible to prevent the key data from being leaked to the external, so that it is possible to more strictly prevent the illegal copy.

Incidentally, this structure can prevent the illegally copied data from being taken into the host computer and thus can prevent the host computer from being influenced by the computer virus etc., in case that the key data is transmitted to the host computer from the information reproducing apparatus S'. For this purpose, the key data is included in the certification information N and the information reproducing apparatus S' as the external memory device judges whether or not the data within the DVD 50 is illegally copied, and the key data is enciphered and is transmitted to the host computer only when the data is judged to be legally copied.

Further, since the key data for the encipher is further enciphered and is included in the certification information N, it is very difficult to illegally scramble-demodulate and decipher the enciphered record information.

Furthermore, since the error correction code EE is added to the certification information N itself, it is possible to recognize the certification information certainly by correcting the certification information N even if the certification information N becomes erroneous at the time of reproduction.

As the certification information N is divided and is included in a plurality of ECC blocks 30", the amount of data replaced to the certification information N is reduced from a view point of just one ECC block 30". Thus, it is possible to reduce the degradation of the error correcting capability in the one ECC block 30" as a whole.

Since the rearrangement of the certification information N is performed over a plurality of ECC blocks 30", it is possible to prevent the leakage of the certification information N more effectively at the time of reproduction.

Although the above described second embodiment is constructed such that the position information PP is inserted into the ECC block 30 which is included in the addition data signal Sde together with the corrected certification information CM, it may be constructed, other than this, such that the position information PP is inserted as a so-called water mark in a range which is not important in a visuality or audibility of a user on the data stream constituted by the video information etc., (e.g., in the high frequency range of the video information).

(III) Modified Embodiments

Next, various modified embodiments of the present invention will be explained.

In the above mentioned embodiments, the identification information having no relation with the essential error correction code and the like is inserted as the identification information 35. As one modified embodiment, the information equivalent to the identification information can be included in the ECC block 30 without inserting the data other than the error correction code, as described below.

Namely, for example, it is assumed that the contents of the data of any one byte within the ECC block 30 are d0, d1, d2 . . . d6 and d7, and that the value of a given bit within the identification information to be included within the ECC block 30 be "3". Then, an array of the data within the one byte is shifted by three bits, is rearranged as follows:

d5, d6, d7, d0, d1 . . . d4, and is recorded onto the DVD 50 (i.e., the stamper disc SP).

Then, by determining the bit number to be shifted in order to obtain the raw data when error-correcting the rearranged data of the one byte at the time of the reproduction, the value of the bit within the identification information is obtained. The repetition of the processes for all of the bits within the identification information realizes the function equivalent to that of the identification information 35 without inserting any data other than the essential data into the ECC block 30.

According to the method of the third variation, assuming that the content of the rearranged data of the one byte is, for example, "10101010", the shifted number may become any one of "0", "2", "4" and "6" in the error correction at the time of the reproduction, which may prevent a unique specification. However, in this case, an increase of a redundancy in the error correction code or a combination of a pattern matching and an error correction enables a proper identification information to be obtained at the time of the reproduction.

That is, for example, the data of "10101010" is repeatedly inserted (i.e., the redundancy is increased) to thereby reduce the number of the data combinations which may be considered at the time of the reproduction. Moreover, the error corrections to the respective data enable the proper identification information (namely, the rightly shifted number) to be obtained.

Moreover, the case in which the present invention is applied to the data recorded on the DVD 50 is explained in the above described embodiments and modifications. In addition, the present invention can be applied to all the cases in which the ECC block is used to execute the error correction of the data.

More actually, the present invention can be applied to a case described below. For example, after the generation of the data including the ECC block 30' (or 30"), the data is transmitted through a telephone line. Then, the data is reproduced if it is confirmed by the transmitted destination that the data is not illegally copied.

In addition, the present invention can be applied to an information recording and reproducing operation which uses an MD (Mini Disc), a DAT (Digital Audio Tape) or a DVD-R (DVD-Recordable) or a data transmission by means of a CATV (Cable Television), similarly to the above mentioned cases.

(IV) Combination with Conventional Illegal Copy Preventing Technique

Next, the embodiment in which the present invention and the conventional technique of preventing the illegal copy are combined is explained.

Namely, for example, the key data to solve the scramble of the video information and the like is recorded as record information, and further the identification information 35 is recorded in accordance with the present invention. Accordingly, it is possible to expect an effect of dually protecting the illegal copy.

Now, more actually, an example is explained in which the present invention is used along with the conventionally proposed technique for protecting the illegal copy.

At first, a conventional technique is briefly explained which is used to protect the illegal copy in combination with the identification information 35 of the first embodiment of the present invention. In the conventional technique, a particular identification information similar to the aforementioned water mark is inserted into a portion which is not important to a human visuality or audibility on a stream of the data constituted by the video information and the like (for example, an area of a high frequency of the video information).

As a configuration of the combination of the identification information in the conventional technique and the identification information in the first embodiment, actually, CGMS (Copy Generation Management System) data (which is data indicative of an allowance or a rejection of a copy or a time shift record (its content is described later.)) for the identification information in the conventional technique is recorded on a data area, and on the other hand, CM (Compliance Mark) data (which is admission data, namely, identification information indicating that it is not illegally copied) for the identification information 35 of the first embodiment is recorded on a portion where the ECC-INNER code 31 and the ECC-OUTER code 32 overlap to each other.

Now, in one concrete example described below, the CGMS data and the CM data are defined as following.

CGMS Data: 00→Allowance of Copy
CGMS Data: 01→Allowance of Time Shift Record
CGMS Data: 11→Rejection of Copy
CM Data: 11→Admitted (Not Illegally Copied)
CM Data: **→Not Admitted (Illegally Copied)

Incidentally, in this definition, "10" is not defined for the CGMS data, and "**" in the CM data represents all the data except "11".

The time shift record indicates that a broadcast program is recorded for a reproduction. That is, the fact that an actual broadcast time is different from a time when the broadcast program is really viewed is referred to as a "time shift". Thus, "01" as the CGMS data implies a case in which the video information and the like are obtained, for example, by a reception of a satellite broadcast, and that it is added only when the recorded broadcast program is allowed to be reproduced in future.

Incidentally, if the video information and the like are sent from the above mentioned optical disc 50, only one of "00" and "11" is added as the CGMS data.

As mentioned above, the video information and the like are scrambled by using the key data, and are then recorded on the optical disc or transmitted. Thus, at this time, the CGMS data which is the part of the video information is also scrambled and is recorded or transmitted.

Then, the information reproducing apparatus for reproducing the DVD 50 or a satellite broadcast receiver for receiving the satellite broadcast (hereafter, referred to as an IRD (Integrated Receiver Decoder)) uses the key data and de-scrambles the video information and the like, and further demodulates to output it as the analog video signal. The CGMS data is also included in this analog video signal.

The actual example of protecting the illegal copy by using the identification information 35 in the present invention and the identification information in the conventional technique in combination will be explained below for a case in which the video information and the like are sent from the DVD 50 and for a case in which the video information and the like are sent from the IRD, with the above explanations as a premise.

(A) Case of Video Information Sent from Optical Disc

In a case that the video information and the like are sent from the DVD 50 (hereinafter, it is generally referred to as an optical disc), devices contained in a system for protecting the illegal copy are as followings.

That is, the device for reproducing the video information and the like includes (i) a player which reproduces an optical disc to output an analog video signal, and (ii) a driver which if the video information and the like recorded on the optical disc are computer data, reproduces the optical disc to output digital data to the computer.

The device for recording the reproduced video information and the like includes (i) a recorder which records thereon the analog video signal output ted by the player and (ii) a writer which records thereon the digital data outputted by the driver.

The player has a decoder IC (Integrated Circuit) for de-scrambling and decoding the video information and the like. The key data for the de-scramble is stored in the decoder IC, which is sent to a manufacturer of the player by a supplier of the optical disc under a severe management. At this time, since the decoder IC itself is made into an IC, the key data cannot be obtained from the external. Hence, a substantially illegal player cannot be manufactured.

As for the driver, the driver is considered as a periphery device of a computer. The driver transfers the video information before the de-scramble (the video information reproduced from the optical disc) to a video input board provided in the computer (which has the components similar to those of the decoder IC in the player, and then de-scrambles and decodes the digital data outputted by the driver). At this time, the driver admitted to be not illegal by the supplier of the video information sends and receives an admission code (i.e., a code data to confirm whether or not both of the driver and the video input board are admitted to be not illegal) to and from the video input board before transferring the digital data to the video input board. The sending and receiving operation of the data is executed only if both of them are admitted. Thus, if any one of the driver and the video input board is not admitted to be not illegal, the sending and receiving operation of the admission code cannot be executed, so that the sending and receiving operation of the digital data cannot be executed either.

On the other hand, in contrast with the above mentioned player or driver, as for the recorder and the writer, there is one case that the recorder or writer is admitted to be not illegal, and there is another case that the admission is not given to the recorder or writer (namely, which is considered to be illegal). Next, the protections of the illegal copy will be explained for these respective cases.

(A-1) Case That Admitted Recorder Records Video information From Player

At first, the admitted recorder sends and receives the admission code to and from the player, and thereby the admitted recorder and the player mutually confirm that they are not illegal. After the confirmation, the admitted recorder extracts the CGMS data from the inputted analog video signal, and starts to record the analog video signal only if the CGMS data is "00".

Now, since the players are all admitted to be not illegal, the recorder admitted to be not illegal newly re-adds "11" as the CM data to the analog video signal outputted from the player (wherein, in the analog video signal, the CM data is erased in accordance with the configuration of the present invention) and records it. Hence, the CGMS data is always "00" and the CM data is always "11", in the video information to be recorded by the admitted recorder.

(A-2) Case That Non-Admitted Recorder Records Video information From Player

Even if a non-admitted recorder is connected to the player, the admission code is firstly sent and received between them. Usually, the admission code cannot be sent and received between them at this stage, resulting in that the player stops the output of the analog video signal to thereby protect the data from being illegally copied.

If any reason causes the player to erroneously recognize that the non-admitted recorder is admitted, the analog video signal is outputted to the recorder and is recorded thereon.

However, the non-admitted recorder cannot re-record the CM data as "11" newly in this case. As a result, the CM data in the video information recorded by the recorder becomes the above mentioned "**". Thus, the video information cannot be reproduced by the other players in accordance with the present invention. Hence, it is possible to protect the reproduction of the illegally copied video information.

(A-3) Case That Admitted Driver Reproduces Optical Disc

If the admitted driver reproduces the optical disc, a transmission destination of the reproduced digital data may be considered as the following three destinations:

① an admitted video input board;
② an admitted writer; and
③ a non-admitted writer.

If the reproduced digital data is transferred to the ③ non-admitted writer among the destinations, the sending and receiving of the admission code to be executed at the initial stage cannot be performed. Thus, the driver can recognize that the writer is not admitted. Accordingly, the digital data is not transferred. This results in the protection of the illegal copy.

If the reproduced digital data is transferred to the ① admitted video input board, the sending and receiving operation of the admission code is firstly executed. After that, the video input board receives the digital data from the driver. Only if the CM data in the digital data is "11", it is de-scrambled, decoded and is then outputted to external devices (e.g., a computer having the video input board).

Of course, the digital data is not sent by the driver, if it is confirmed that the video input board is illegal and is not admitted when the sending and receiving operation of the admission code is firstly executed.

Moreover, if the reproduced digital data is transferred to the ② admitted writer, the process is performed similarly to the above mentioned case that the admitted recorder records the video information from the player. Only the video information in which the CGMS data is "00" and the CM data is "11" is recorded.

(A-4) Case That Non-Admitted Driver Reproduces Optical Disc

In this case, the initial sending and receiving operation of the admission code prevents the digital data from being outputted to the admitted video input board and the admitted writer (it is implemented such that the video input board or the writer rejects the input of the digital data from the non-admitted driver). After all, the destination to which the digital data is transferred is only the non-admitted writer. If the non-admitted writer records the digital data, the CM data becomes "**". Thus, the player and the video input board recognize that the data recorded by the writer is illegally copied and thereby do not reproduce it.

As in the above mentioned explanations of the respective cases, the CGMS data is inserted into the video information, and further the CM data is inserted into the ECC code area. Therefore, it is possible to substantially exclude the illegally copied optical disc.

(B) Case of Video information Sent From Satellite Broadcast

If the IRD for receiving and decoding the satellite broadcast is combined with the admitted recorder, the sending and receiving operation of the admission code is firstly performed between the IRD and the recorder. Then, the IRD and the admitted recorder mutually confirm that they are not illegal.

Here, in the video information sent from the satellite broadcast, the CGMS data is any one of "01" and "11". If the CGMS data is not inserted, the CGMS data is "01". That is, if the time shift record is allowed, the illegal copy is made over and over again from the data which has been once copied.

In the recorder which broadcasts the combination of the CGMS data and the CM data as the satellite broadcast and receives it by means of the IRD and then records it, the recorder and the IRD mutually execute the admitting process. Then, the CGMS data is set to "01" if the supplier of the video information is the IRD, and further the CM data set to "11" is added to the video information, and recorded on the optical disc or a video tape. In this case, it is possible to perform the time shift record from the optical disc or the video data after that.

On the other hand, if the recorder judges that the supplier of the video information is not the IRD but the player as the result of the mutual admissions (that is, if the data once recorded on the optical disc is being reproduced by the player after the reception of the satellite broadcast), it is judged whether the CGMS data in the video information is "01" or "00". If the CGMS data is "01", this implies that the data once recorded on the optical disc is again copied. Thus, the CM data is recorded as "". Accordingly, since the CM data is "", the data is not reproduced by the player and the like after that. Hence, it is possible to protect the copy and the reproduction in multiple stages. Incidentally, the method in which even if the recording operation of the recorder is allowed, the reproduction thereof is not allowed uses up the optical disc as compared with the case in which the recording operation itself of the recorder is not allowed. Therefore, this method is effective in protecting against the illegal copy.

(C) Another Actual Example

As another actual example, it is possible to implement the present invention so as to record the admission data (i.e., the admission data indicating that it is not illegally copied) as the sub-identification information similar to the CM data within the video information area, in addition to the identification information (i.e., the above mentioned CGMS) inserted into the video information area of the optical disc and further record the CM data in the ECC code area.

At this time, a CM data N and an admission data M inserted into the video information area are added so as to have a relation of M=f(N) by using a predetermined function f. This results in a further improvement of the effect of protecting against the illegal copy.

That is, the video information is not reproduced if there is not the above mentioned relation between the detected admission data M and CM data N, when the video information is reproduced.

Since the function f is set as mentioned above, even if any one of the CM data N and the admission data M is illegally obtained by any method, the other data cannot be obtained from the one obtained data, unless the function f is obtained. Thus, it is possible to protect the reproduction of the illegally copied video information.

Moreover, if the admission data M is changed and recorded on the basis of the CM data N and the function f for each ECC block 30, it is possible to protect the CM data N and the admission data M themselves from being leaked to the external. That is, since the CM data N and the admission data M can be randomly changed, it is further difficult to specify the regularity as compared with the case of recording only the fixed CM data N. Accordingly, it is possible to protect against the illegal copy.

In the above mentioned actual example, the case is described in which the CGMS data is inserted into the video information area. In addition, if the video information is data of an MPEG (Moving Picture Expert Group) type, the identification data for each picture, namely, the data indicating any one of an I (Intra-coded) picture, a P (Predictive-coded) picture and a B (Bidirectionally Predictive-coded) picture may be inserted into the video information area as the identification information.

In this case, the admitted recorder can make the kind of the original image coincident with the kind of the picture to thereby perform an accurate recording operation at a time of encoding for the recording operation.

On the other hand, the video information recorded by the non-admitted recorder is recorded in such a condition that the identification of the kind of each picture and the correlation with the original image are not adequately established. Thus, if the player detects that the identification and the correlation are not adequately established, the illegal copy can be detected.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description and all changes which come within the meaning and range of equivalency of the claims are therefore intended to be embraced therein.

The entire disclosures of Japanese Patent Applications No. 10-185348 filed on Jun. 30$^{th}$, 1998, No. 9-241498 filed on Sep. 5$^{th}$, 1997, No. 9-250986 filed on Sep. 16$^{th}$, 1997 and U.S. Ser. No. 09/145,913 filed on Sep. 2$^{nd}$, 1998, including the specification, claims, drawings and summary are incorporated herein by reference in its entirety.

What is claimed is:

1. An information generating method of generating output information to be outputted, comprising the processes of:

adding an error correction code, which is used for an error correction of the output information when the output information is outputted, to the output information to thereby generate the output information having the error correction code;

replacing a part of the output information having the error correction code, which is generated by said adding process, with identification information indicating that the output information to be outputted is not illegally copied to thereby generate the partially replaced output information; and adding sub-identification information, which indicates that the output information is not illegally copied, to the output information, wherein in said error correction code adding process, the error correction code is added to the output information to which the sub-identification information is added to thereby generate the output information having the error correction code and the sub-identification information, and assuming that M represents the sub-identification information and N represents the identification information, a relationship between the sub-identification information M and the identification information N is expressed on the basis of a predetermined function f by a following expression (1)/

$$M=f(N) \tag{1}.$$

2. An information record medium on and from which record information is recorded and reproduced, comprising:

an error correction code recorded on said information record medium by adding the error correction code, which is used for an error correction of the record information when the record information is reproduced, to the record information to thereby generate the record information having the error correction code;

identification information recorded on said information record medium by replacing a part of the record information having the error correction code, with the identification information indicating that the record information to be reproduced is not illegally copied to thereby generate the partially replaced record information; and sub-identification information recorded on said information record medium by adding the sub-identification information, which indicates that the record information is not illegally copied, to the record information in advance, wherein the error correction code is recorded by adding the error correction code to the record information to which the sub-identification information is added to thereby generate the record information having the error correction code and the sub-identification information, and assuming that M represents the sub-identification information and N represents the identification information, a relationship between the sub-identification information M and the identification information N is expressed on the basis of a predetermined function f by a following expression (1)/

$$M=f(N) \qquad (1).$$

3. An information reproducing method of reproducing record information from an information record medium, (i) said information record medium comprising:

an error correction code recorded on said information record medium by adding the error correction code, which is used for an error correction of the record information when the record information is reproduced, to the record information to thereby generate the record information having the error correction code; and identification information recorded on said information record medium by replacing a part of the record information having the error correction code, with the identification information indicating that the record information to be reproduced is not illegally copied to thereby generate the partially replaced record information, (ii) said information reproducing method comprising the processes of:

detecting the partially replaced record information from said information record medium;

extracting the identification information from the partially replaced record information detected by said detecting process;

judging whether or not the identification information is extracted by said extracting process; and reproducing the record information by applying the error correction to the partially replaced record information, which is detected by said detecting process, by use of the error correction code only if the identification information is judged to be extracted by said judging process;

wherein:

(i) said information record medium further comprises sub-identification information recorded on said information record medium by adding the sub-identification information, which indicates that the record information is not illegally copied, to the record information in advance, the error correction code is recorded by adding the error correction code to the record information to which the sub-identification information is added to thereby generate the record information having the error correction code and the sub-identification information, and assuming that M represents the sub-identification information and N represents the identification information, a relationship between the sub-identification information M and the identification information N is expressed on the basis of a predetermined function f by a following expression (1), $$M=f(N) \qquad (1); \text{ and}$$

(ii) in said extracting process, the identification information and the sub-identification information are extracted from the partially replaced record information, in said judging process, it is judged whether or not the identification information is extracted, and it is judged whether or not the relationship is expressed by the expression (1), and in said reproducing process, the record information is reproduced only if the identification information is judged to be extracted and the relationship is judged to be expressed by the expression (1).

4. An information reproducing method of reproducing record information from an information record medium, (i) said information record medium comprising:

an error correction code recorded on said information record medium by adding the error correction code, which is used for an error correction of the record information when the record information is reproduced, to the record information to thereby generate the record information having the error correction code; and identification information recorded on said information record medium by replacing a part of the record information having the error correction code, with the identification information indicating that the record information to be reproduced is not illegally copied to thereby generate the partially replaced record information, (ii) said information reproducing method comprising the processes of:

detecting the partially replaced record information from said information record medium:

extracting the identification information from the partially replaced record information detected by said detecting process;

judging whether or not the identification information is extracted by said extracting process;

applying the error correction to the partially replaced record information, which is detected by said detecting process, by use of the error correction code; and reproducing the record information on the basis of the partially replaced record information, to which the error correction is applied, only if the identification information is judged to be extracted by said judging process;

wherein:

(i) said information record medium further comprises sub-identification information recorded on said information record medium by adding the sub-identification information, which indicates that the record information is not illegally copied, to the record information in advance, the error correction code is recorded by adding the error correction code to the record information to which the sub-identification information is added to thereby generate the record information having the error correction code and the sub-identification information, and assuming that M represents the sub-identification information and N represents the identification information, a relationship between the sub-identification information M and the identification information N is expressed on the basis of a predetermined function f by a following expression (1), $$M=f(N) \qquad (1); \text{ and}$$

(ii) in said extracting process, the identification information and the sub-identification information are extracted from the partially replaced record information, in said judging process, it is judged whether or not the identification information is extracted, and it is judged whether or not the relationship is expressed by the expression (1), and in said reproducing process, the record information is reproduced only if the identification information is judged to be extracted and the relationship is judged to be expressed by the expression (1).

5. An information generating apparatus for generating output information to be outputted, comprising:

an error correcting code adding device for adding an error correction code, which is used for an error correction of the output information when the output information is outputted, to the output information to thereby generate the output information having the error correction code;

a replacing device for replacing a part of the output information having the error correction code, which is generated by said error correcting code adding device, with identification information indicating that the output information to be outputted is not illegally copied to thereby generate the partially replaced output information; and a sub-identification information adding device for adding sub-identification information, which indicates that the output information is not illegally copied, to the output information, wherein said error correction code adding device adds the error correction code to the output information to which the sub-identification information is added to thereby generate the output information having the error correction code and the sub-identification information, and assuming that M represents the sub-identification information and N represents the identification information, a relationship between the sub-identification information M and the identification information N is expressed on the basis of a predetermined function f by a following expression (1)/

$$M=f(N) \qquad (1).$$

6. An information reproducing apparatus for reproducing record information from an information record medium, (i) said information record medium comprising:

an error correction code recorded on said information record medium by adding the error correction code, which is used for an error correction of the record information when the record information is reproduced, to the record information to thereby generate the record information having the error correction code; and identification information recorded on said information record medium by replacing a part of the record information having the error correction code, with the identification information indicating that the record information to be reproduced is not illegally copied to thereby generate the partially replaced record information, (ii) said information reproducing apparatus comprising:

a detecting device for detecting the partially replaced record information from said information record medium;

an extracting device for extracting the identification information from the partially replaced record information detected by said detecting device;

a judging device for judging whether or not the identification information is extracted by said extracting device;

a reproducing device for reproducing the record information by applying the error correction to the partially replaced record information, which is detected by said detecting device, by use of the error correction code only if the identification information is judged to be extracted by said judging device; and wherein:

(i) said information record medium further comprises sub-identification information recorded on said information record medium by adding the sub-identification information, which indicates that the record information is not illegally copied, to the record information in advance, the error correction code is recorded by adding the error correction code to the record information to which the sub-identification information is added to thereby generate the record information having the error correction code and the sub-identification information, and assuming that M represents the sub-identification information and N represents the identification information, a relationship between the sub-identification information M and the identification information N is expressed on the basis of a predetermined function f by a following expression (1), $$M=f(N) \qquad (1); \text{ and}$$

(ii) said extracting device extracts the identification information and the sub-identification information from the partially replaced record information, said judging device judges whether or not the identification information is extracted, and whether or not the relationship is expressed by the expression (1), and said reproducing device reproduces the record information only if the identification information is judged to be extracted and the relationship is judged to be expressed by the expression (1).

7. An information reproducing apparatus for reproducing record information from an information record medium, (i) said information record medium comprising:

an error correction code recorded on said information record medium by adding the error correction code, which is used for an error correction of the record information when the record information is reproduced, to the record information to thereby generate the record information having the error correction code; and identification information recorded on said information record medium by replacing a part of the record information having the error correction code, with the identification information indicating that the record information to be reproduced is not illegally copied to thereby generate the partially replaced record information, (ii) said information reproducing apparatus comprising:
a detecting device for detecting the partially replaced record information from said information record medium;
an extracting device for extracting the identification information from the partially replaced record information detected by said detecting device;
a judging device for judging whether or not the identification information is extracted by said extracting device;
an error correction applying device for applying the error correction to the partially replaced record information, which is detected by said detecting device, by use of the error correction code;
a reproducing device for reproducing the record information on the basis of the partially replaced record information, to which the error correction is applied, only if the identification information is judged to be extracted by said judging device; and
wherein:
(i) said information record medium further comprises sub-identification information recorded on said information record medium by adding the sub-identification information, which indicates that the record information is not illegally copied, to the record information in advance,
the error correction code is recorded by adding the error correction code to the record information to which the sub-identification information is added to thereby generate the record information having the error correction code and the sub-identification information, and
assuming that M represents the sub-identification information and N represents the identification information, a relationship between the sub-identification information M and the identification information N is expressed on the basis of a predetermined function f by a following expression (1), $$M=f(N) \qquad (1); and$$

(ii) said extracting device extracts the identification information and the sub-identification information from the partially replaced record information,
said judging device judges whether or not the identification information is extracted, and whether or not the relationship is expressed by the expression (1), and
said reproducing device reproduces the record information only if the identification information is judged to be extracted and the relationship is judged to be expressed by the expression (1).

8. An information record medium on and from which record information is recorded and reproduced, comprising:
an error correction code recorded on said information record medium by adding the error correction code, which is used for an error correction of the record information when the record information is reproduced, to the record information to thereby generate the record information having the error correction code;
identification information recorded on said information record medium by replacing one part of the record information having the error correction code, with the identification information indicating that the record information to be reproduced is not illegally copied to thereby generate the partially replaced record information;
position information recorded on said information record medium by replacing another part of the record information having the error correction code with the position information indicating a position of the identification information within the partially replaced record information; and
wherein the identification information is generated by rearranging each of codes constituting original identification information, which is set in advance and which indicates that the record information is not illegally copied.

9. An information record medium according to claim 8, wherein the identification information is generated by rearranging the codes, which correspond to a plurality of error correction units for the error correction, simultaneously within the original identification information.

10. An information record medium on and from which record information is recorded and reproduced, comprising:
an error correction code recorded on said information record medium by adding the error correction code, which is used for an error correction of the record information when the record information is reproduced, to the record information to thereby generate the record information having the error correction code;
identification information recorded on said information record medium by replacing one part of the record information having the error correction code, with the identification information indicating that the record information to be reproduced is not illegally copied to thereby generate the partially replaced record information;
position information recorded on said information record medium by replacing another part of the record information having the error correction code with the position information indicating a position of the identification information within the partially replaced record information; and
wherein the partially replaced record information is generated by replacing one portion of the record information having the error correction code such that one identification information is included over a plurality of error correction units for the error correction.

11. An information record medium on and from which record information is recorded and reproduced, comprising:
an error correction code recorded on said information record medium by adding the error correction code, which is used for an error correction of the record information when the record information is reproduced, to the record information to thereby generate the record information having the error correction code;
identification information recorded on said information record medium by replacing one part of the record information having the error correction code, with the identification information indicating that the record information to be reproduced is not illegally copied to thereby generate the partially replaced record information;
position information recorded on said information record medium by replacing another part of the record information having the error correction code with the position information indicating a position of the identification information within the partially replaced record information; and wherein:

the record information before adding the error correction code is enciphered by an enciphering process which is varied in correspondence with a time of enciphering, and a content of the enciphering process and version information indicating the time of enciphering are included in the identification information.

12. An information record medium according to claim 11, wherein encipher key information indicating an encipher key used in the enciphering process is included in the identification information.

13. An information record medium according to claim 12, wherein the encipher key information is inserted in the identification information after the encipher key information is enciphered by an enciphering process which is set in advance.

14. An information record medium on and from which record information is recorded and reproduced, comprising:

an error correction code recorded on said information record medium by adding the error correction code, which is used for an error correction of the record information when the record information is reproduced, to the record information to thereby generate the record information having the error correction code;

identification information recorded on said information record medium by replacing one part of the record information having the error correction code, with the identification information indicating that the record information to be reproduced is not illegally copied to thereby generate the partially replaced record information;

position information recorded on said information record medium by replacing another part of the record information having the error correction code with the position information indicating a position of the identification information within the partially replaced record information; and wherein the partially replaced record information is generated by replacing one part of the record information having the error correction code with (i) the error correction code, which is used for an error correction of the identification information when the record information is reproduced, and (ii) the identification information.

15. An information record medium on and from which record information is recorded and reproduced, comprising:

an error correction code recorded on said information record medium by adding the error correction code, which is used for an error correction of the record information when the record information is reproduced, to the record information to thereby generate the record information having the error correction code;

identification information recorded on said information record medium by replacing one part of the record information having the error correction code, with the identification information indicating that the record information to be reproduced is not illegally copied to thereby generate the partially replaced record information;

position information recorded on said information record medium by replacing another part of the record information having the error correction code with the position information indicating a position of the identification information within the partially replaced record information; and wherein:

said information record medium further comprises sub-identification information recorded on said information record medium by adding the sub-identification information, which indicates that the record information is not illegally copied, to the record information in advance, the error correction code is recorded by adding the error correction code to the record information to which the sub-identification information is added to thereby generate the record information having the error correction code and the sub-identification information, and assuming that M represents the sub-identification information and N represents the identification information, a relationship between the sub-identification information M and the identification information N is expressed on the basis of a predetermined function f by a following expression (1)/

$$M=f(N) \tag{1}.$$

16. An information generating apparatus for generating output information to be outputted, comprising:

an error correcting code adding device for adding an error correction code, which is used for an error correction of the output information when the output information is outputted, to the output information to thereby generate the output information having the error correction code;

a replacing device for replacing one part of the output information having the error correction code, which is generated by said error correcting code adding device, with identification information indicating that the output information to be outputted is not illegally copied to thereby generate the partially replaced output information, and for replacing another part of the output information having the error correction code with position information indicating a position of the identification information within the partially replaced output information; and a rearranging device for rearranging each of codes constituting original identification information, which is set in advance and which indicates that the output information is not illegally copied, to thereby generate the identification information, and said replacing device replaces one part of the output information having the error correction code with the identification information generated by said rearranging device, to thereby generate the partially replaced output information.

17. An information generating apparatus according to claim 16, wherein said rearranging device rearranges the codes, which correspond to a plurality of error correction units for the error correction, simultaneously within the original identification information, to thereby generate the identification information.

18. An information generating apparatus for generating output information to be outputted, comprising:

an error correcting code adding device for adding an error correction code, which is used for an error correction of the output information when the output information is outputted, to the output information to thereby generate the output information having the error correction code;

a replacing device for replacing one part of the output information having the error correction code, which is generated by said error correcting code adding device, with identification information indicating that the output information to be outputted is not illegally copied to thereby generate the partially replaced output information, and for replacing another part of the output information having the error correction code with position information indicating a position of the identification information within the partially replaced output information; and wherein said replacing device replaces one portion of the output information having the error correction code such that one identification information is included over a plurality of error correction units for the error correction.

19. An information generating apparatus for generating output information to be outputted, comprising:

an error correcting code adding device for adding an error correction code, which is used for an error correction of the output information when the output information is outputted, to the output information to thereby generate the output information having the error correction code;

a replacing device for replacing one part of the output information having the error correction code, which is generated by said error correcting code adding device, with identification information indicating that the output information to be outputted is not illegally copied to thereby generate the partially replaced output information, and for replacing another part of the output information having the error correction code with position information indicating a position of the identification information within the partially replaced output information;

an enciphering device for enciphering the output information before adding the error correction code by an enciphering process which is varied in correspondence with a time of enciphering, and a content of the enciphering process and version information indicating the time of enciphering are included in the identification information.

20. An information generating apparatus according to claim 19, wherein encipher key information indicating an encipher key used in the enciphering process is included in the identification information.

21. An information generating apparatus according to claim 20, wherein said apparatus further comprises an encipher key inserting device for inserting the encipher key information into the identification information after enciphering the encipher key information by an enciphering process which is set in advance.

22. An information generating apparatus for generating output information to be outputted, comprising:

an error correcting code adding device for adding an error correction code, which is used for an error correction of the output information when the output information is outputted, to the output information to thereby generate the output information having the error correction code;

a replacing device for replacing one part of the output information having the error correction code, which is generated by said error correcting code adding device, with identification information indicating that the output information to be outputted is not illegally copied to thereby generate the partially replaced output information, and for replacing another part of the output information having the error correction code with position information indicating a position of the identification information within the partially replaced output information; and wherein said replacing device replaces one part of the output information having the error correction code with (i) the error correction code, which is used for an error correction of the identification information when the output information is outputted, and (ii) the identification information, to thereby generate the partially replaced output information.

23. An information generating apparatus for generating output information to be outputted, comprising:

an error correcting code adding device for adding an error correction code, which is used for an error correction of the output information when the output information is outputted, to the output information to thereby generate the output information having the error correction code; and a replacing device for replacing one part of the output information having the error correction code, which is generated by said error correcting code adding device, with identification information indicating that the output information to be outputted is not illegally copied to thereby generate the partially replaced output information, and for replacing another part of the output information having the error correction code with position information indicating a position of the identification information within the partially replaced output information; and a sub-identification information adding device for adding sub-identification information, which indicates that the output information is not illegally copied, to the output information, said error correction code adding device adds the error correction code to the output information to which the sub-identification information is added to thereby generate the output information having the error correction code and the sub-identification information, and assuming that M represents the sub-identification information and N represents the identification information, a relationship between the sub-identification information M and the identification information N is expressed on the basis of a predetermined function f by a following expression (1)/

$$M = f(N) \qquad (1).$$

* * * * *